United States Patent [19]

Nakao et al.

[11] Patent Number: 5,642,434
[45] Date of Patent: Jun. 24, 1997

[54] METHOD FOR SHAPE DETECTION USING DENSITY CORRELATION VALVES

[75] Inventors: Masaya Nakao, Moriguchi; Yoshihiro Itsuzaki, Kashihara; Kinji Horikami, Suita; Misuzu Takano, Hirakata, all of Japan

[73] Assignee: Matsushita Electric Industrial Co., Ltd., Kadoma, Japan

[21] Appl. No.: 273,142

[22] Filed: Jul. 14, 1994

[30] Foreign Application Priority Data

Jul. 14, 1993 [JP] Japan .................. 5-174134
Aug. 5, 1993 [JP] Japan .................. 5-194355

[51] Int. Cl.⁶ ............................................ G06K 9/66
[52] U.S. Cl. ...................... 382/220; 382/159; 382/205
[58] Field of Search ......................... 382/217–223, 382/209, 205, 156–159, 203, 117

[56] References Cited

U.S. PATENT DOCUMENTS

| | | | |
|---|---|---|---|
| 4,747,150 | 5/1988 | Knutsson et al. | 382/220 |
| 5,111,516 | 5/1992 | Nakano et al. | 382/203 |
| 5,272,766 | 12/1993 | Higgins et al. | 382/218 |
| 5,293,427 | 3/1994 | Ueno et al. | 382/173 |
| 5,347,591 | 9/1994 | Onishi et al. | 382/203 |
| 5,500,906 | 3/1996 | Picard et al. | 382/220 |

*Primary Examiner*—Michael T. Razavi
*Assistant Examiner*—Larry J. Prikockis
*Attorney, Agent, or Firm*—Wenderoth, Lind & Ponack

[57] ABSTRACT

Each pixel of a density reference area of a reference image is assigned a predetermined coefficient value in accordance with whether the pixel is located within a peripheral boundary of a to be detected shape, external the peripheral boundary of the to-be-detected shape, or on the peripheral boundary of the to-be-detected shape. An actual image of an object containing the to-be-detected shape is then obtained, and after setting a target pixel of the resultant image, the image density of each pixel is multiplied by the coefficient values of the density reference area of the reference image. The resultant products are transformed into a density correlation value for the target pixel. The location of the target pixel is then scanned to determine the location of a target pixel at which a maximum or a minimum density correlation value is obtained. The thus determined location is detected as the location of the to-be-detected shape within the object.

4 Claims, 26 Drawing Sheets

Fig. 21
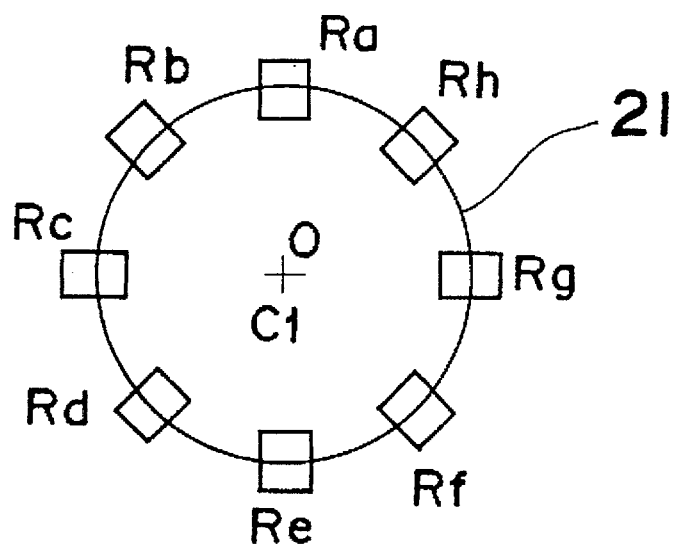
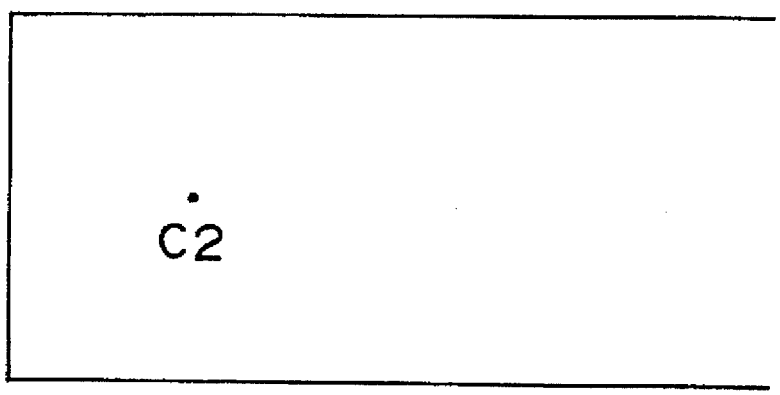

METHOD FOR SHAPE DETECTION USING DENSITY CORRELATION VALVES

BACKGROUND OF THE INVENTION

The present invention relates to a method for shape detection, by which a specified shape is detected based on image information of an object.

As a method conventionally used for detecting the shape of an object in many cases, there is a template matching method. In the template matching method, a specified partial image is previously cut out from a standard image of the object, and then stored in a memory as a standard template. For each point in the image of the object at detecting time, a partial image located at a relative position to the point as reference is cut out to calculate similarity to the stored standard template and detect a position coinciding with the standard template based on the similarity. The similarity is generally obtained by calculating a sum of absolute values of the difference between points (pixels) respectively corresponding to the standard template and the partial image. Then, a position of the partial image where the similarity becomes minimum is used as a detecting position.

However, it is possible to carry out erroneous detection when the image has some change in brightness by the conventional method. This is described using an image of an object with reference to FIG. 32. It is assumed that a purpose is to detect a position of a circular hole 11 formed in a plate 10. Reference numeral 12 denotes a background portion. First, a standard template is stored. At that time, for simplification, the density of the plate portion is 50 uniformly, the density of the hole portion is 20 uniformly, and each portion surrounded by a dotted line 13 is stored in memory as the standard template. When a similar object is picked up to recognize the position of the circular hole, it is assumed that the density of the plate portion is changed to 100, the density of the hole portion is changed to 70, and the density of background portion is changed to 40 in accordance with the change in brightness with time. The similarity when the standard template completely coincides with a partial image is found by Expression 25 wherein the number of pixels in the hole portion within the template is Nh and the number of the pixels in the plate portion is Nb.

$$Nh \times |70-20| + Nb \times |100-50| = 50 \times Nh + 50 \times Nb \qquad \text{(Expression 25)}$$

Similarity when the partial image is cut out from the background portion is found by Expression 26.

$$Nh \times |40-20| + Nb \times |40-50| = 20 \times Nh + 10 \times Nb \qquad \text{(Expression 26)}$$

In such a case, the similarities when the partial image is present in the background portion becomes smaller than those when the partial image is not present therein, as shown by the Expressions 25 and 26. Thus, it may be erroneously detected that the object to be detected is present in the background portion.

SUMMARY OF THE INVENTION

Accordingly, an object of the present invention is to provide a method for shape detection, which makes it possible to detect a shape correctly even if an image of an object includes some portions having considerable density variation in addition to the to-be-detected object.

In accomplishing the object, according to one aspect of the present invention, there is provided a method for shape detection, which is carried out while referring to a teaching process including: a first step for dividing an image into a plurality of pixels in a matrix state and setting a target pixel within the image, and for setting a plurality of sub-areas composed of a plurality of pixels as a density reference area at points corresponding to a periphery of a shape to be detected and storing positions of the pixels within the density reference area as relative positions of the target pixel; and a second step for setting a coefficient corresponding to image densities of the shape to be detected, with respect to each of the pixels contained in the density reference area, the method comprising:
- a third step for picking up by a camera an image of an object including the shape to be detected and detecting an image density of each of the pixels in the image picked-up by the camera;
- a fourth step for calculating products of the coefficient set in the teaching process and the image density detected in the third step for the individual pixels within the density reference area, and calculating a sum of these products as a density correlation value; and
- a fifth step for repeatedly performing the third and fourth steps while the position of the target pixel is moved within the image, so that such a position of the target pixel in which a total sum of the density correlation values becomes a maximum or minimum is detected as the position where the detection shape is present.

BRIEF DESCRIPTION OF THE DRAWINGS

These and other objects and features of the present invention will become clear from the following description taken in conjunction with the preferred embodiments thereof with reference to the accompanying drawings, in which:

FIG. 21 is a view for explaining a case where the target pixel is coincident with the center of a circular hole in a third embodiment of the present invention;

DETAILED DESCRIPTION OF THE PREFERRED EMBODIMENTS

Figure 1:
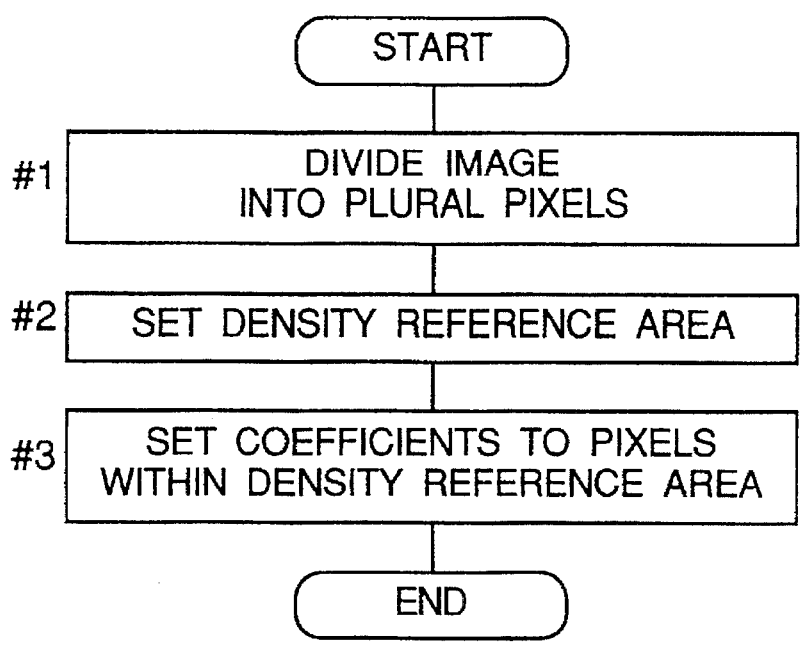
FIGS. 1 and 2 are a teaching flow chart and a detection flow chart, respectively, of the method for shape detection according to a first embodiment of the present invention.

Before the description of the present invention proceeds, it is to be noted that like parts are designated by like reference numerals throughout the accompanying drawings.

A method for shape detection according to a first embodiment of the present invention is described with reference to the accompanying drawings. The following description is directed to a case of detecting a circular hole present within an object.

Figure 2:
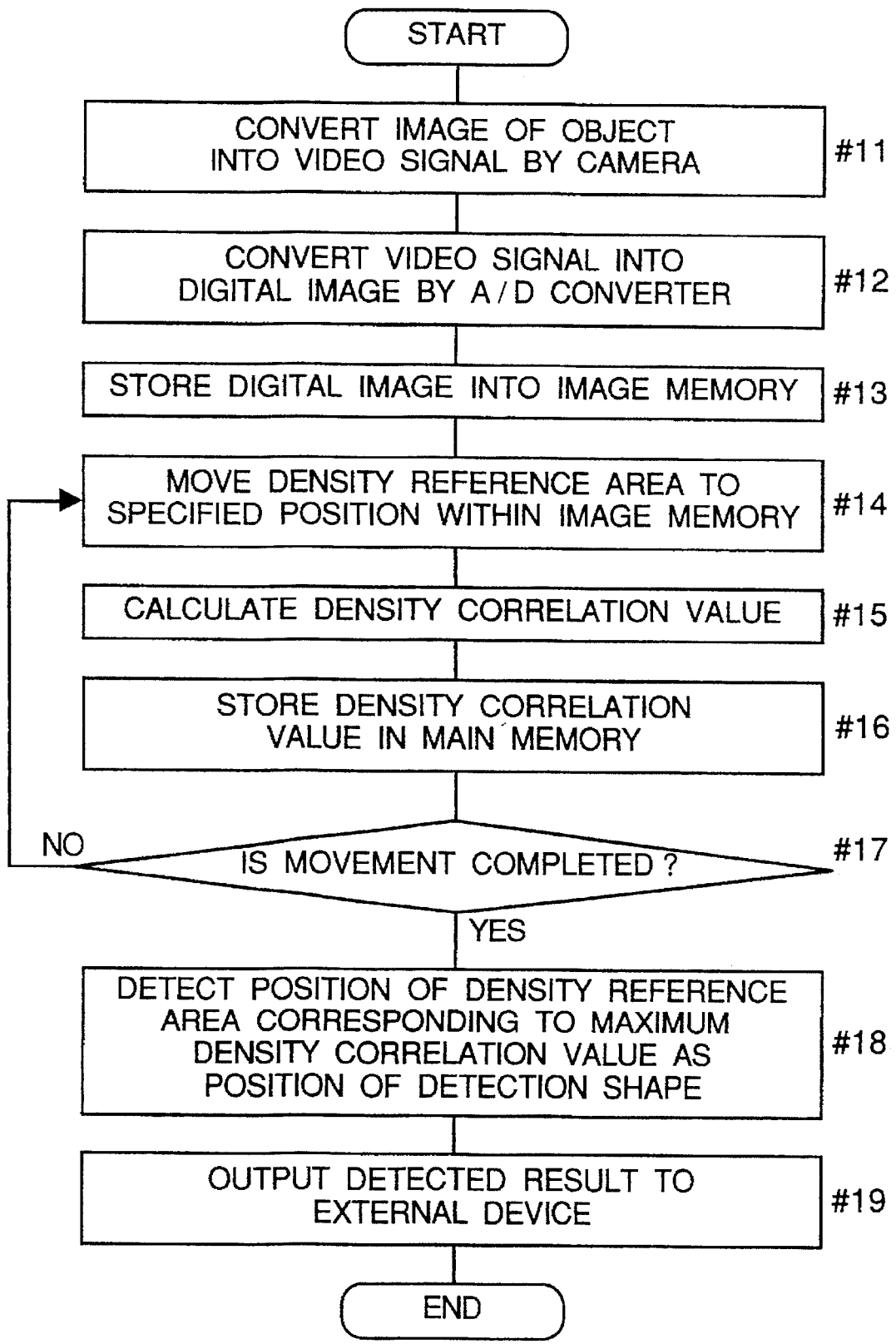

FIGS. 1 and 2 are a teaching flow chart and a detection flow chart, respectively, of the method for shape detection.

Figure 3:
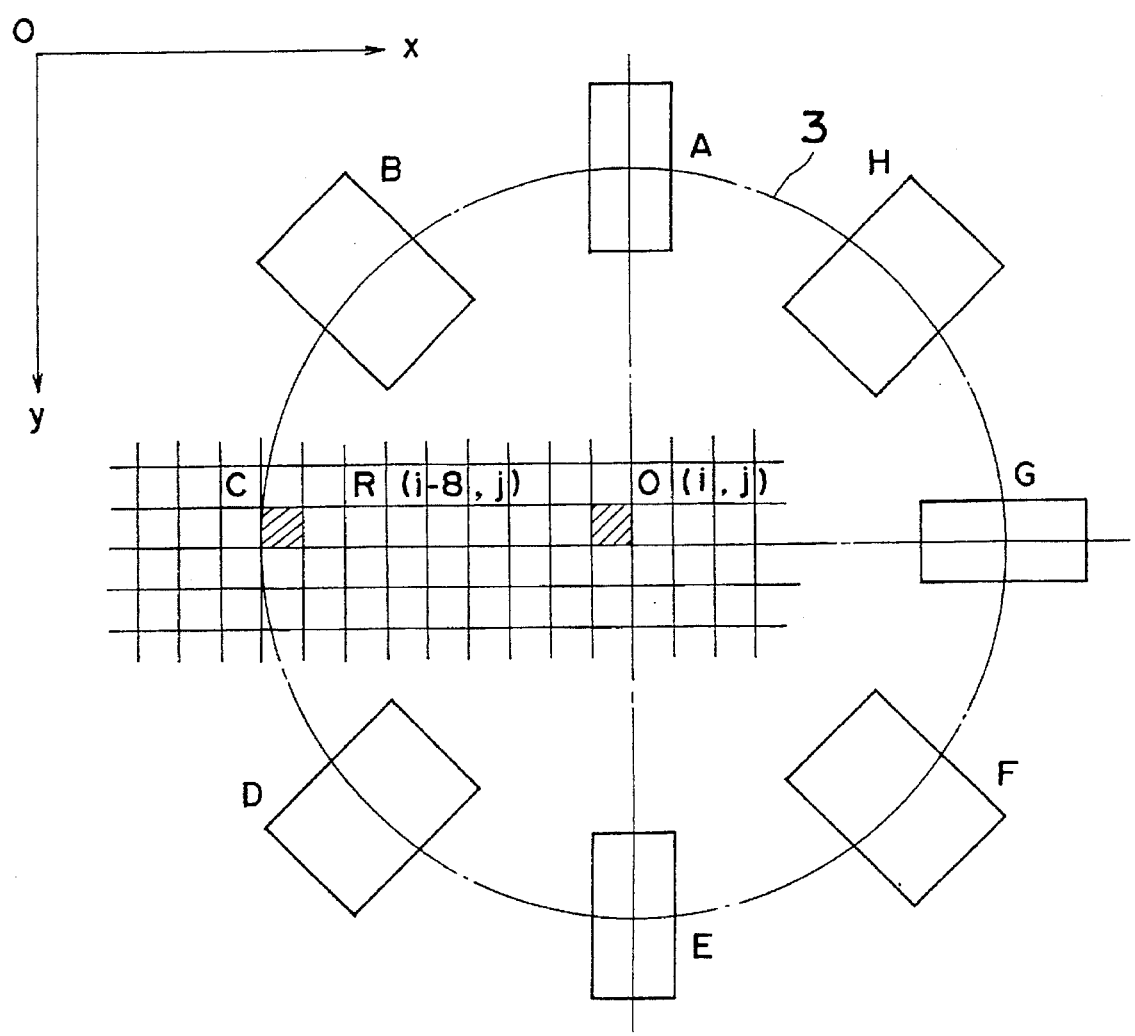
FIG. 3 is a view showing the density reference area of the first embodiment.
Figure 4:
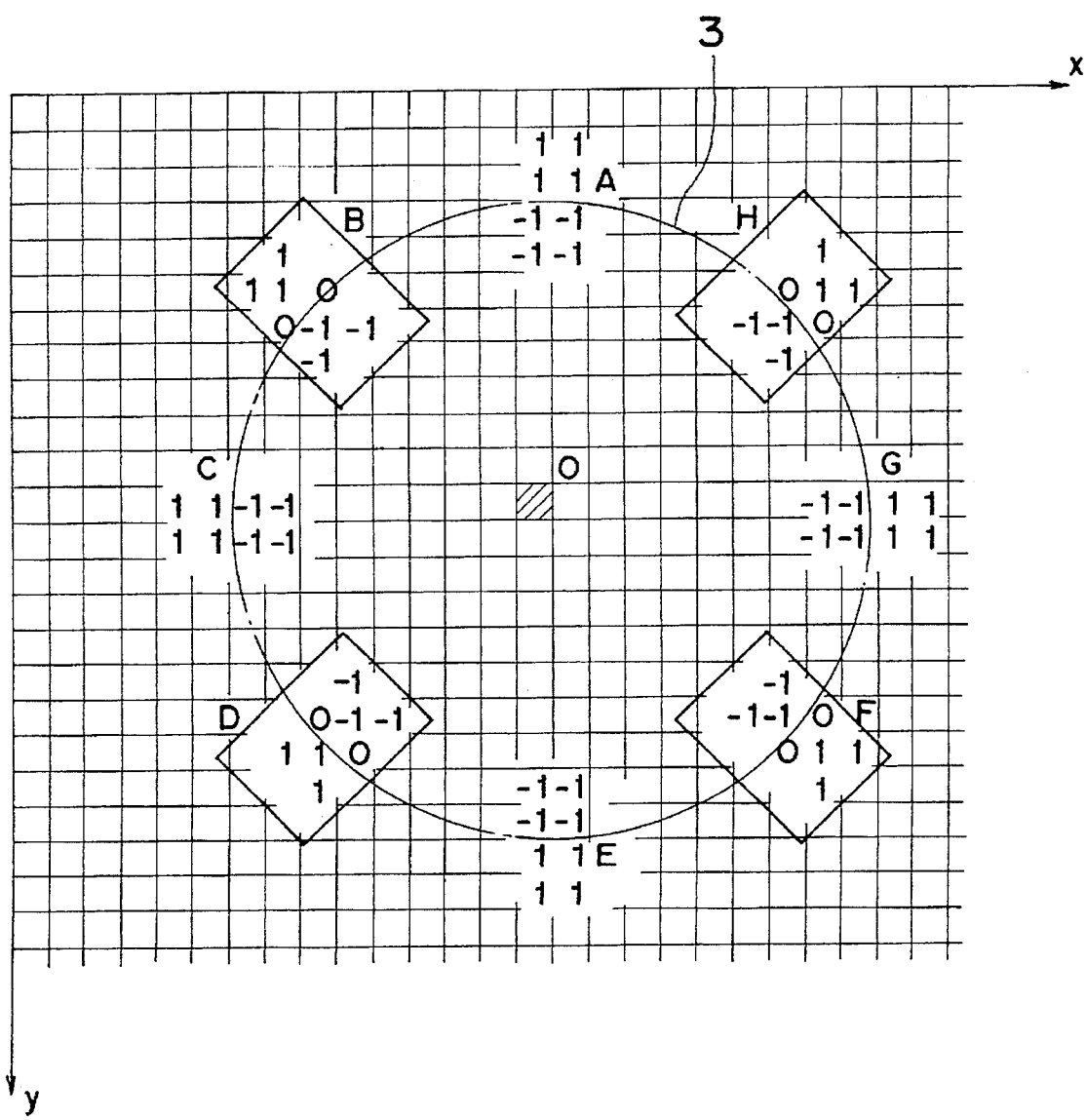
FIG. 4 is a view showing examples of the coefficients for calculating partial density correlation values in the first embodiment.
Figure 5:
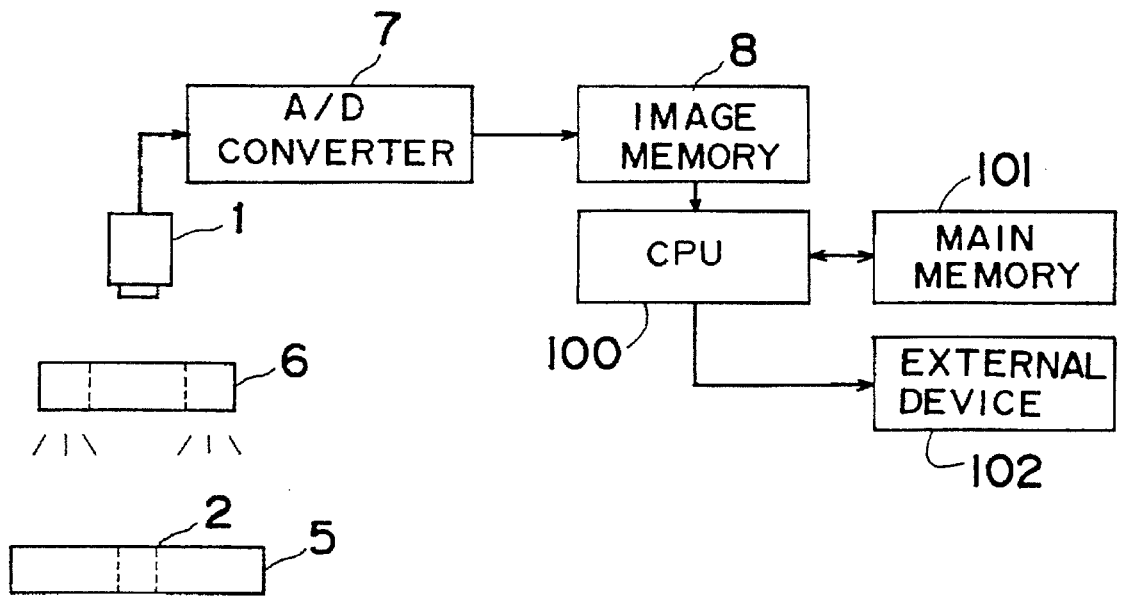
FIG. 5 is a view showing an apparatus for carrying out the method for shape detection.
Figure 6:
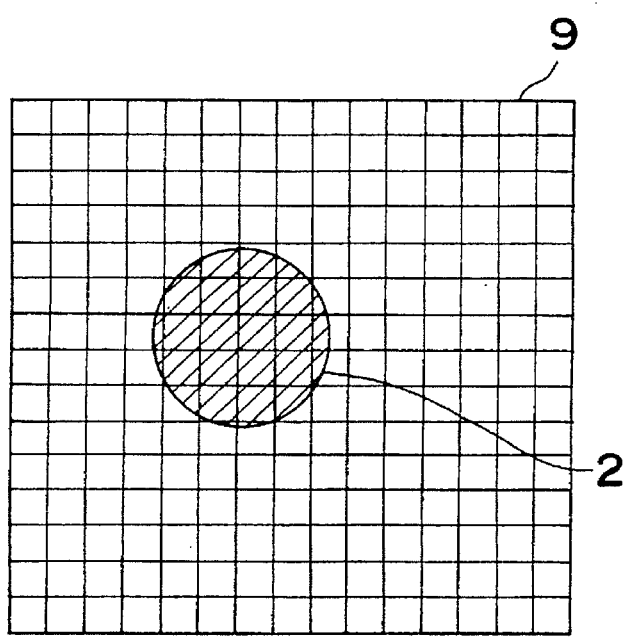
FIG. 6 is a view showing the image of the object in the first embodiment.

FIG. 3 is a view showing the density reference area. FIG. 4 is a view showing examples of the coefficients for calculating partial density correlation values. FIG. 5 is a view showing an apparatus for carrying out the method for shape detection. FIG. 6 is a view showing the image of the object.

Figure 7:
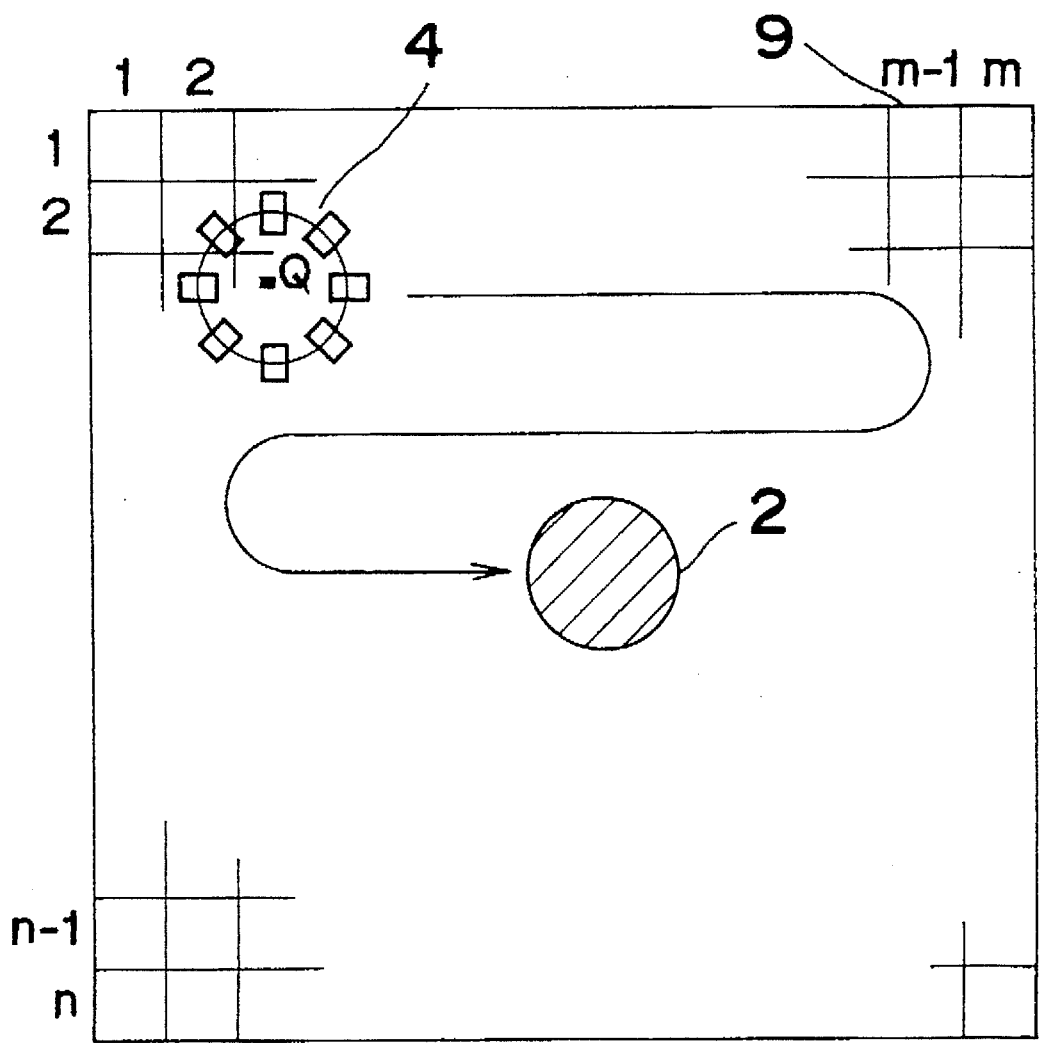
FIG. 7 is a view showing the movement of the density reference area within the image of the object.
Figure 8:
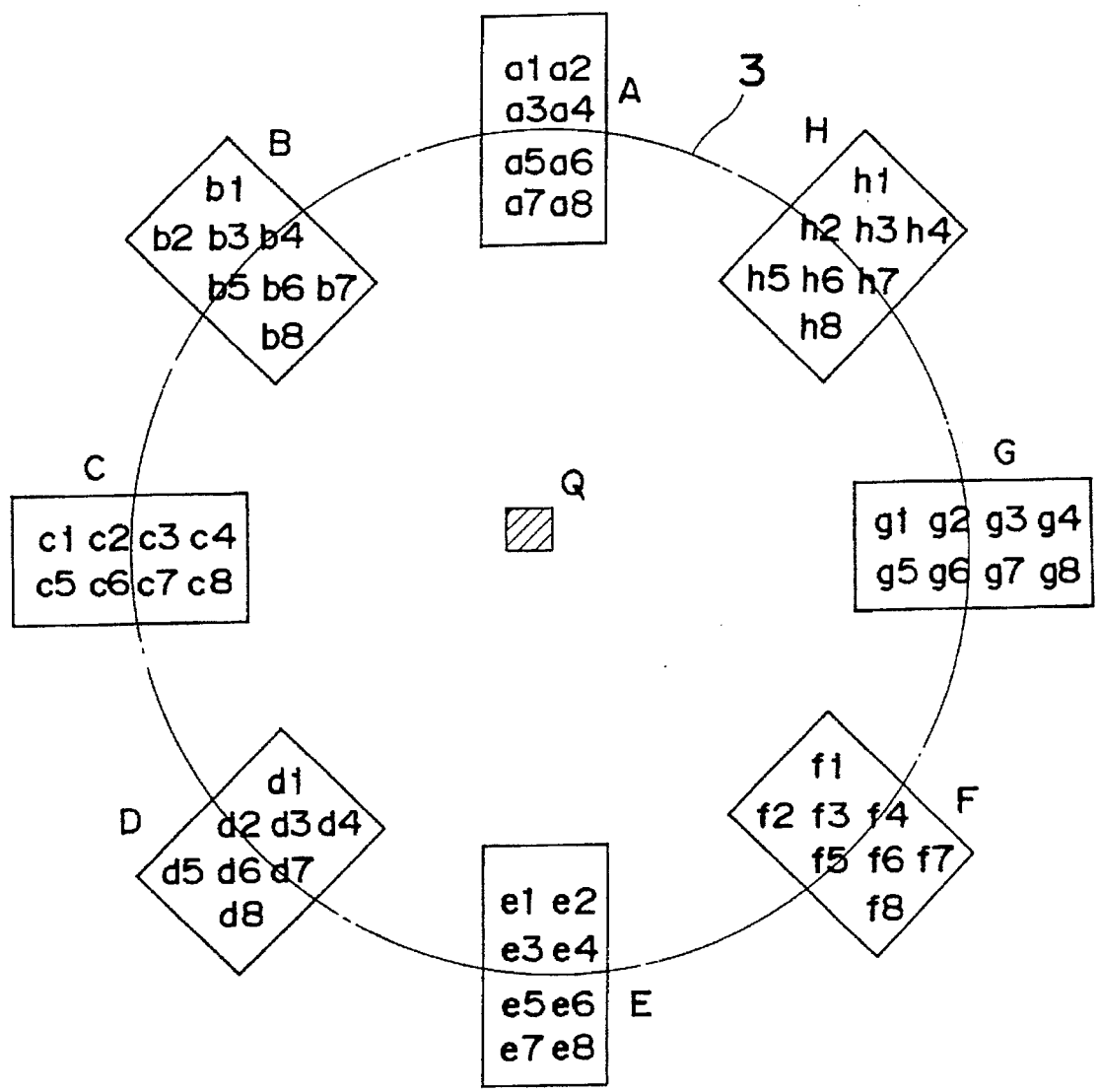
FIG. 8 is a view showing image density of pixels within the density reference area in the first embodiment.
Figure 9:
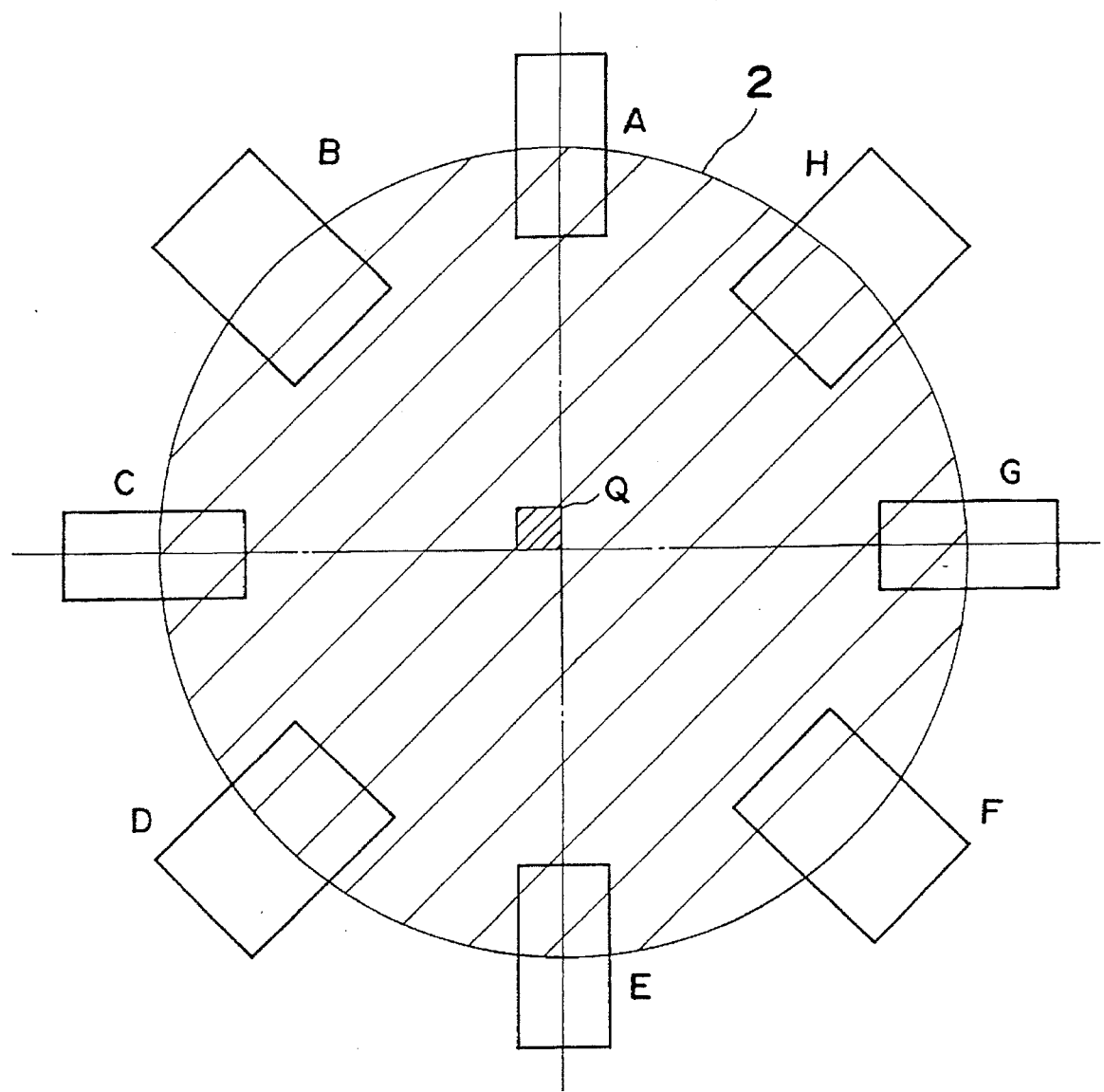
FIG. 9 is a view showing a case where the density reference area is coincident with a circular hole in the first embodiment.

Further, FIG. 7 is a view showing the movement of the density reference area within the image of the object. FIG. 8 is a view showing image density of pixels within the densities reference area. FIG. 9 is a view showing a case where the density reference area is coincident with the circular hole.

First, in the teaching process in FIG. 1, an image which corresponds to an object picked-up by a camera 1, and at step #11 described below, is divided into a plurality (=m×n) of pixels, where the coordinate representing the position of the left uppermost pixel is assumed as (1, 1), and the coordinate representing the position of the right lowermost pixel is assumed as (m, n) (step #1).

Next, attention is paid to a target pixel Q present at a position (i, j) (where $1 \leq i \leq m$ and $1 \leq j \leq n$). As shown in FIG. 3, a circle 3 identical in shape to a circular hole 2 that is the shape to be detected is assumed, and sub-areas A to H each composed of eight pixels are set on and near the circumference of the circle These sub-areas are collectively referred to as a density reference area 4 (step #2).

The positions where the pixels constituting the density reference area 4 are present are stored in a main memory 101 in FIG. 5 each as a relative position to the target pixel Q. For example, the position of a pixel R present inside a sub-area C shown by slanting lines in FIG. 3 is stored as (i−8, j).

Subsequently, coefficients of −1, 0, 1 are set to the pixels constituting the density reference area 4 (step #3). For the setting of coefficients, a coefficient of −1 is assigned to the pixels present inside the circumference of the circle 3 out of the pixels present inside the sub-areas A to H as shown in FIG. 4. Another coefficient of 1 is assigned to the pixels present outside the circumference of the circle 3. The remaining coefficient of 0 is assigned to the pixels present and extended over the circumference of the circle 3.

After these steps #1–3 are carried out as a preprocessing stage, an object 5 including the circular hole 2, which is the object of detection, is prepared for the detecting process.

First, light is applied to the object 5 including the circular hole 2 by a ring type illuminator 6 as shown in FIG. 5. The ring type illuminator 6 is located below the camera 1 so that the shadow of the camera 1 will not be projected onto the object 5. By the light being applied, the surface of the object 5 is uniformly illuminated, so that the circular hole 2 becomes a dark shadow as shown in FIG. 6.

Next, the image of the object 5 is picked up by the camera 1 (step #11 in FIG. 2). At step #12, image densities are converted into digital values by an analog-to-digital converter 7 so that discrete image density values can be obtained for the pixels divided at step #1. Thereafter, an image 9 of the object is stored into an image memory 8 (step #13). The following calculation processes etc. are carried out in a CPU 100.

Next, as shown in FIG. 7, the target pixel Q is sequentially moved within the image 9 of the object (step #14). In this step #14, all of the pixels constituting the density reference area 4 move to a specified position in correspondence with the variation of the positional coordinate (i, j) of the target pixel Q. That is, the movement of the target pixel Q means movement of the density reference area 4.

Then, for each position to which the target pixel Q is moved, a product (hereinafter, referred to as partial density correlation value) of the coefficients set to the pixels of the sub-areas A to H at step #3 of the teaching process and image densities of their corresponding pixels is calculated. Further, the density correlation value, which is the total sum of the partial density correlation values, is calculated at step #15 and stored into the main memory 101 (step #16).

If image densities of the pixels contained in the sub-areas A to H are a1 to a8, b1 to b8, c1 to c8, d1 to d8, e1 to e8, f1 to f8, g1 to g8, and h1 to h8 as shown in FIG. 8, then the density correlation value V can be expressed by Expression 1:

$$
\begin{aligned}
V = \quad & a1 + a2 \quad + a3 + a4 - a5 \quad - a6 - a7 \quad - a8 + \\
& b1 + b2 \quad + b3 \quad\quad\quad\quad\quad - b6 - b7 \quad - b8 + \\
& c1 + c2 \quad - c3 - c4 + c5 \quad + c6 - c7 \quad - c8 - \\
& d1 \quad\quad\quad - d3 - d4 + d5 \quad + d6 \quad\quad + d8 - \\
& e1 - e2 \quad - e3 - e4 + e5 \quad + e6 + e7 \quad + e8 - \\
& f1 - f2 \quad - f3 \quad\quad\quad\quad\quad + f6 + f7 \quad + f8 - \\
& g1 - g2 \quad + g3 + g4 - g5 \quad - g6 + g7 \quad + g8 + \\
& h1 \quad\quad\quad + h3 + h4 - h5 \quad - h6 \quad\quad - h8
\end{aligned}
$$

(Expression 1)

Each time the target pixel Q is moved to a specified position within the image 9 of the object, steps #14 through #16 are carried out repeatedly. When the movement of the target pixel Q to all the preset specified positions has been completed, the calculation of the density correlation values is ended (step #17).

Then, out of the density correlation values calculated for the individual positions of movement of the target pixel Q and stored into the main memory 101, one that has the maximum value is searched and its corresponding position of the target pixel Q, i.e. position of the density reference area 4, is detected as the position where the circular hole 2, which is the object to be detected, is present (step #18). At step #19, the detected result is outputted from the CPU 100 to an external device 102 such as a display, a printer, or another CPU etc.

Below described is the reason why the position of the shape to be detected can be detected with the position of the target pixel Q corresponding to the maximum density correlation value, that is, the fact that the circle 3, which is the location reference for the density reference area 4, is coincident with the circular hole 2 when the density correlation value becomes a maximum.

As stated before, out of the pixels present within the sub-areas A to H, a coefficient of −1 is assigned to pixels present inside the circumference of the circle 3, while another coefficient of 1 is assigned to pixels present outside the circumference of the circle 3. Accordingly, the partial density correlation value v for one sub-area can be expressed as Expression 2:

v=(total sum of image densities of pixels present in the outer half of the circle 3)−(total sum of image densities of pixels present in the inner half of the circle 3)   (Expression 2)

Therefore, the partial density correlation value represented by Expression 2 becomes a maximum when the "total sum of image densities of pixels present in the outer half of the circle 3" is a maximum and the "total sum of image densities of pixels present in the inner half of the circle 3" is a minimum.

The brighter the image is, the larger the image density value is expressed, and the darker the image is, the smaller the image density value is expressed. Therefore, the brighter the outside of the circumference of the circle 3 is and the darker the inside of the circumference of the circle 3 is, the larger the partial density correlation value for one sub-area becomes. In other words, when the circumference of the circle 3 is coincident with the circumference of the circular hole 2, the partial density correlation value for the sub-area becomes a maximum.

As a consequence, the density correlation value given as the total sum of partial density correlation values determined for each sub-area becomes a maximum when the partial density correlation value becomes a maximum for every sub-area A to H, i.e., when the circle 3 is coincident with the circular hole 2 as shown in FIG. 9.

Next, a second embodiment of the present invention is described with reference to the accompanying drawings.

Figure 10:
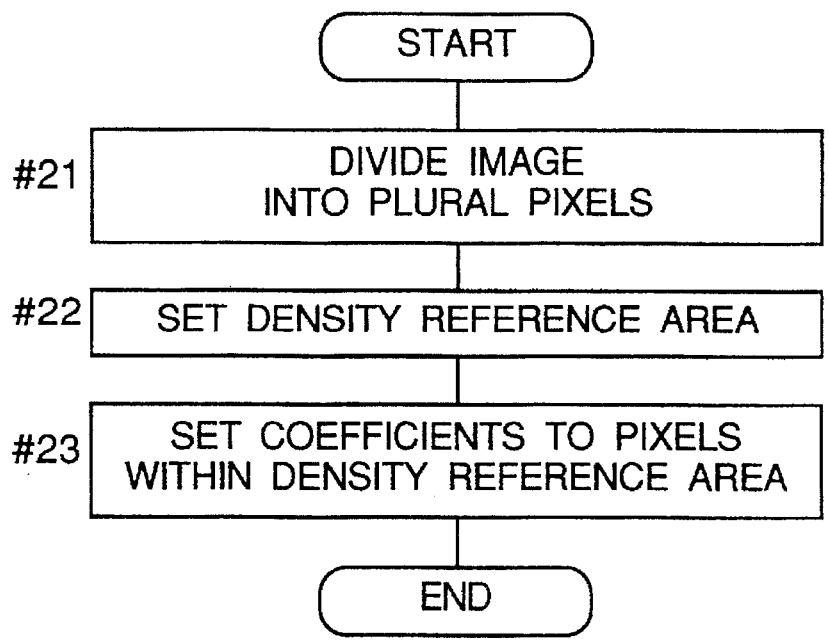
FIGS. 10 and 11 are a teaching flow chart and a detection flow chart, respectively, of the method for shape detection according to a second embodiment of the present invention.
Figure 11:
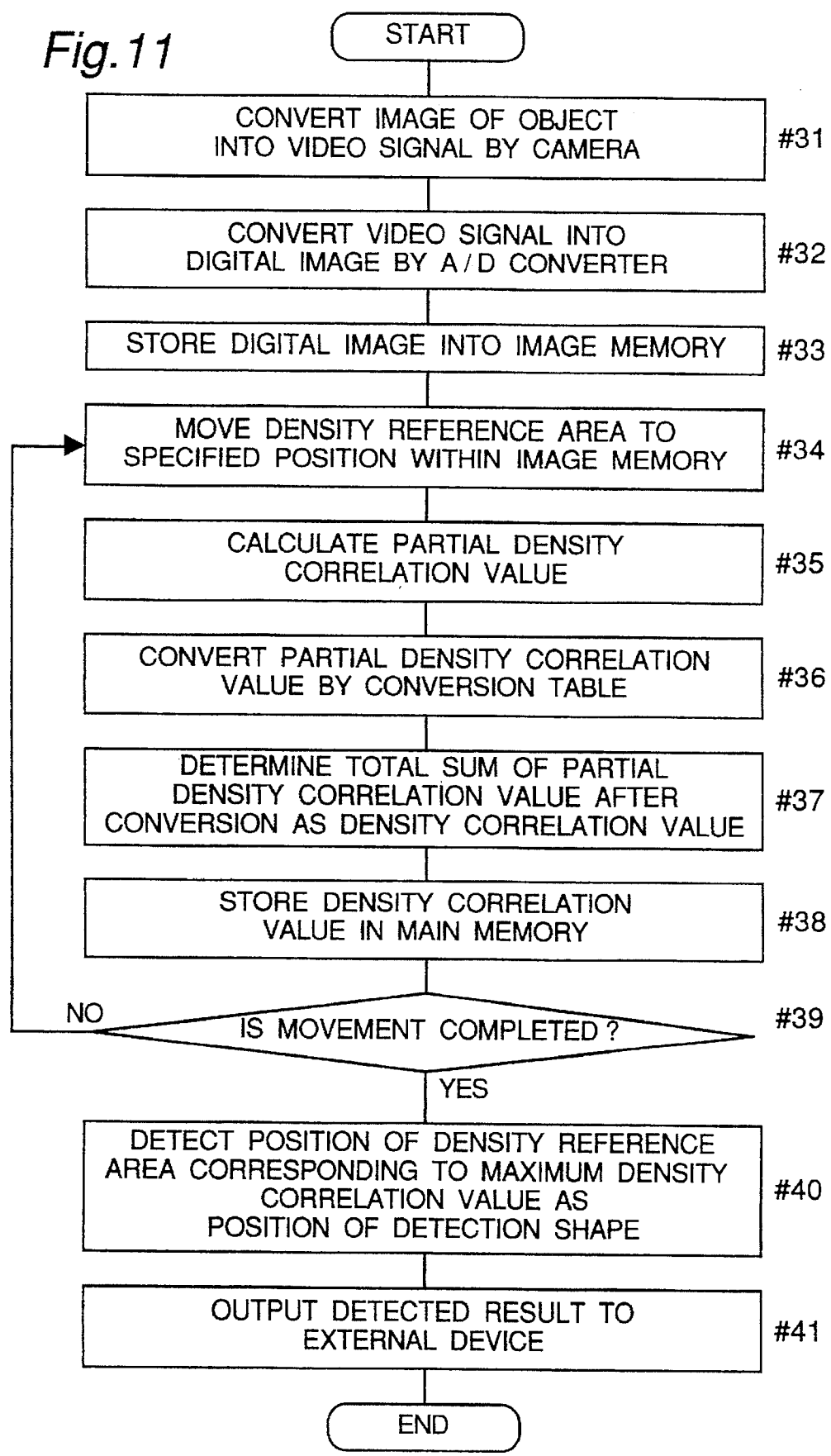
Figure 12:
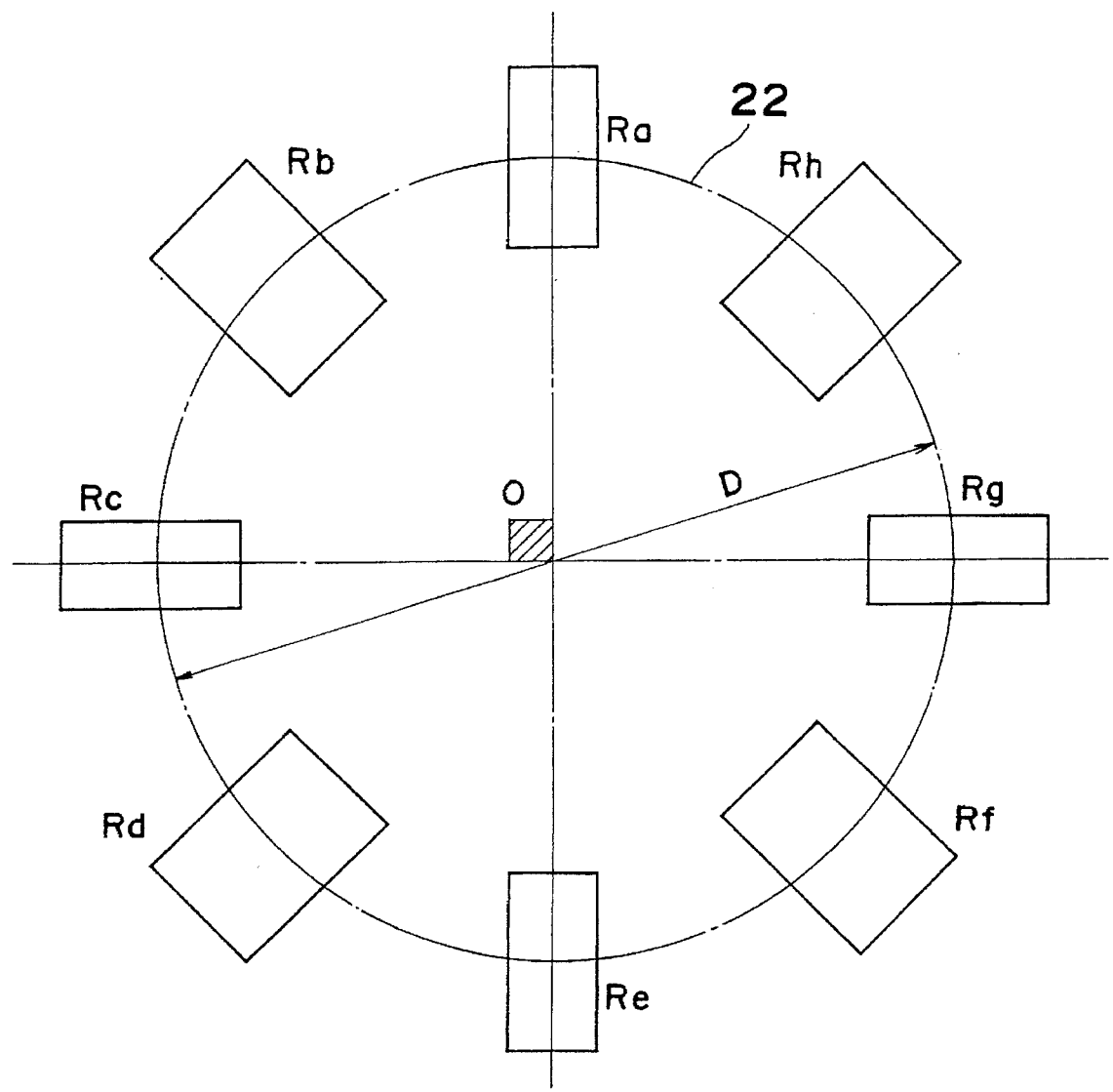
FIG. 12 is a view showing the density reference area of the second embodiment.
Figure 13:
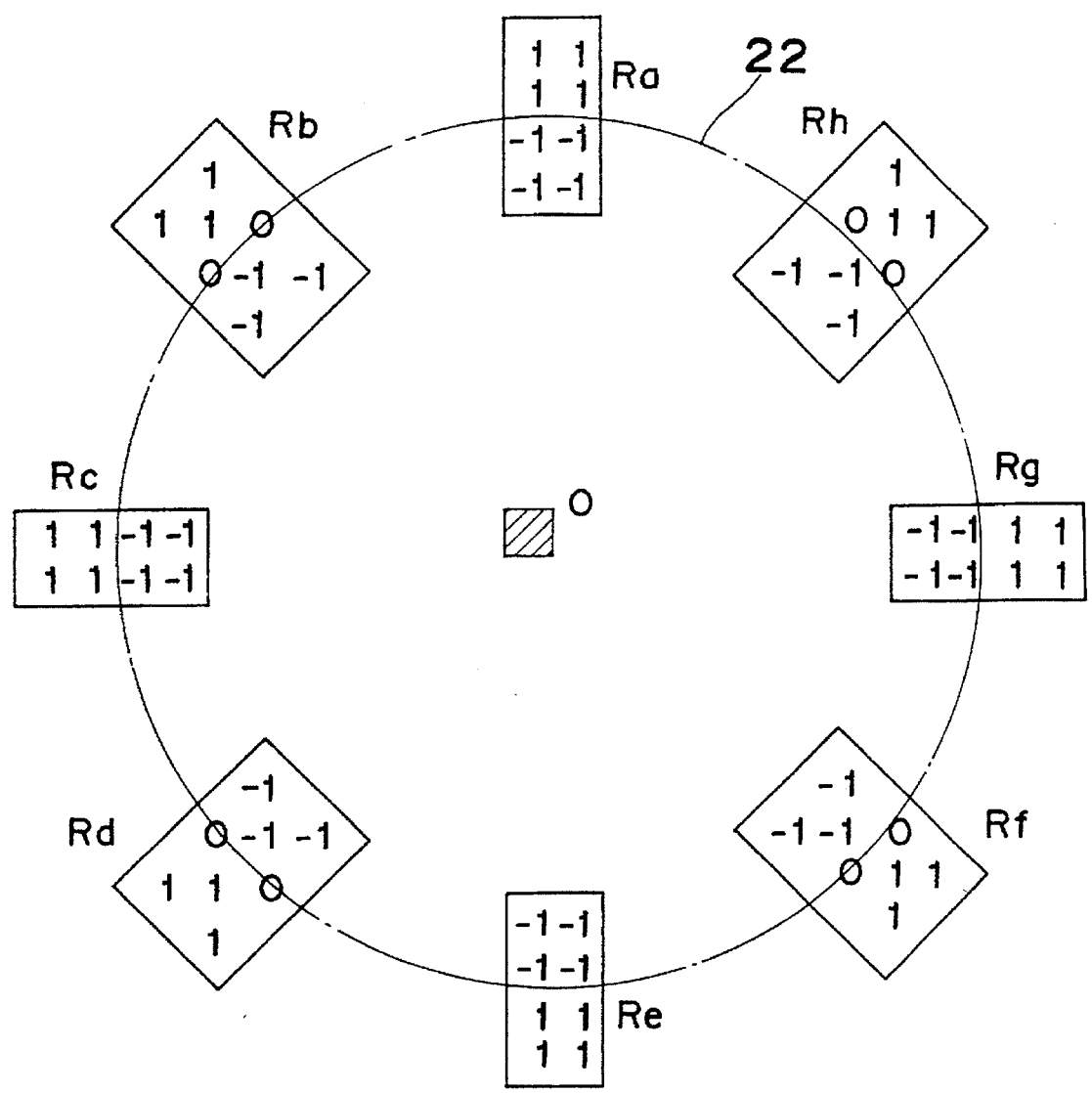
FIG. 13 is a view showing examples of the coefficients for calculating partial density correlation values in the second embodiment.
Figure 14:
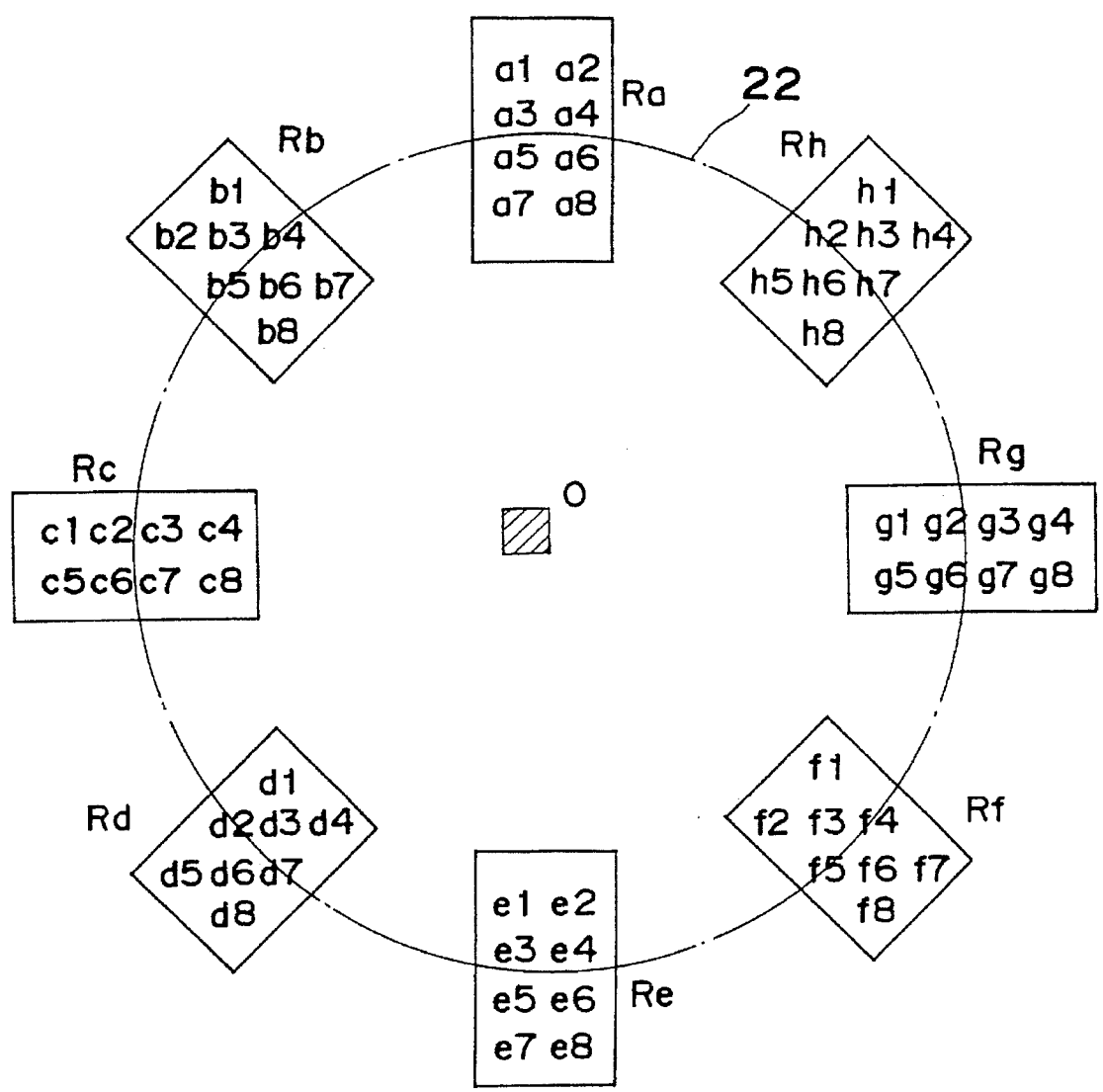
FIG. 14 is a view showing image density of pixels within the density reference area in the second embodiment.

The following description of the second embodiment is simplified in parts overlapping the method for shape detection of the first embodiment. FIGS. 10 and 11 are a teaching flow chart and a detection flow chart, respectively, of the method for shape detection according to the second embodiment of the present invention. FIG. 12 is a view showing the density reference area of the second embodiment. FIG. 13 is a view showing examples of the coefficients for calculating partial density correlation values in the second embodiment. FIG. 14 is a view showing image densities of pixels within the density reference area in the second embodiment.

Figure 15:
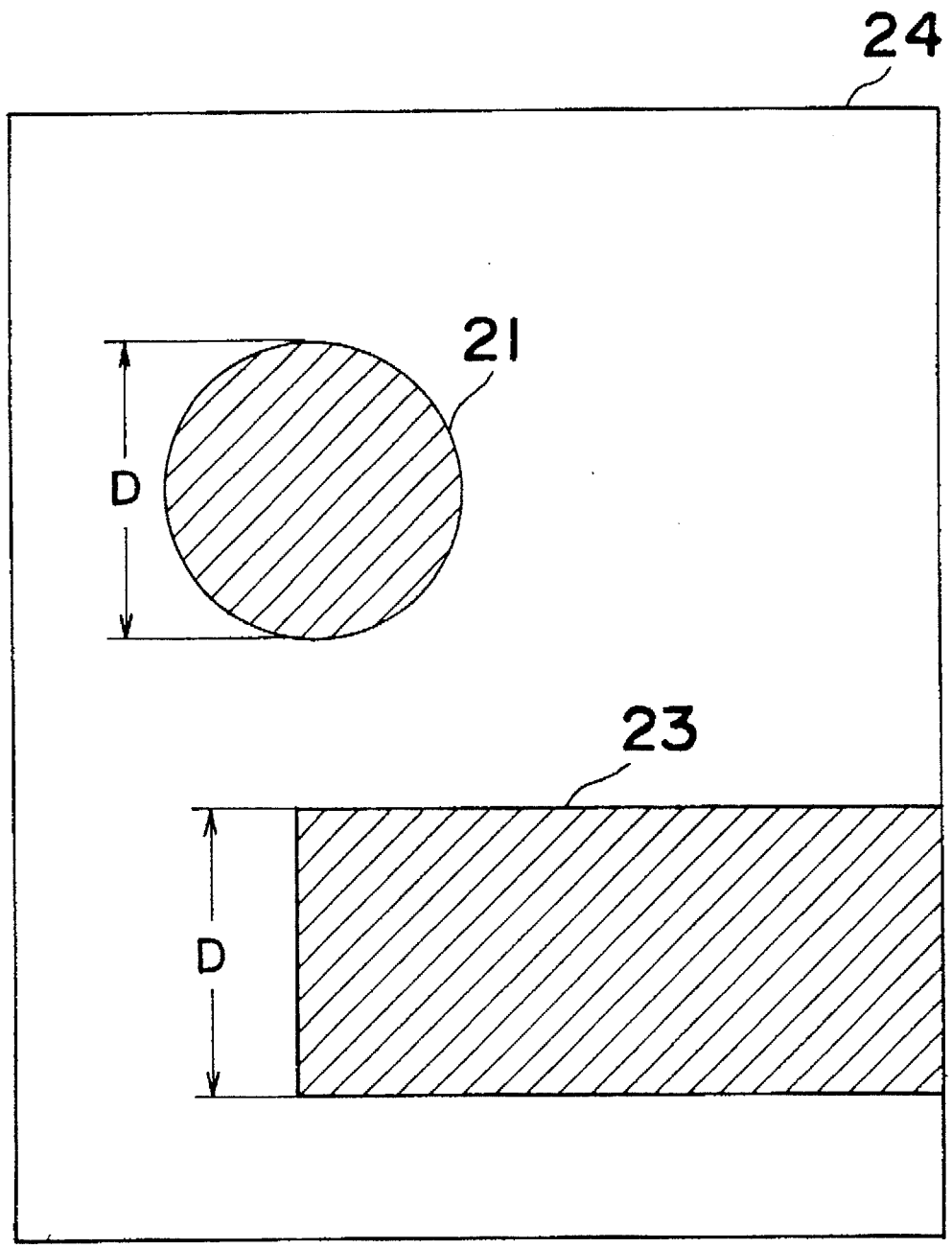
FIG. 15 is a view showing the image of the object in the second embodiment.
Figure 16:
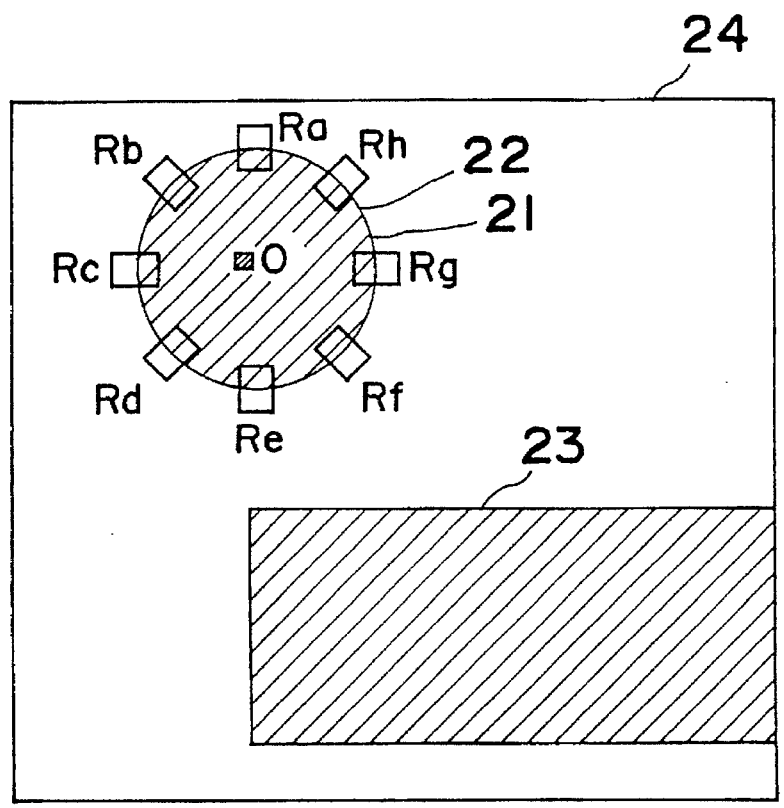
FIG. 16 is a view showing a case where the density reference area is on the circular hole side in the second embodiment.
Figure 17:
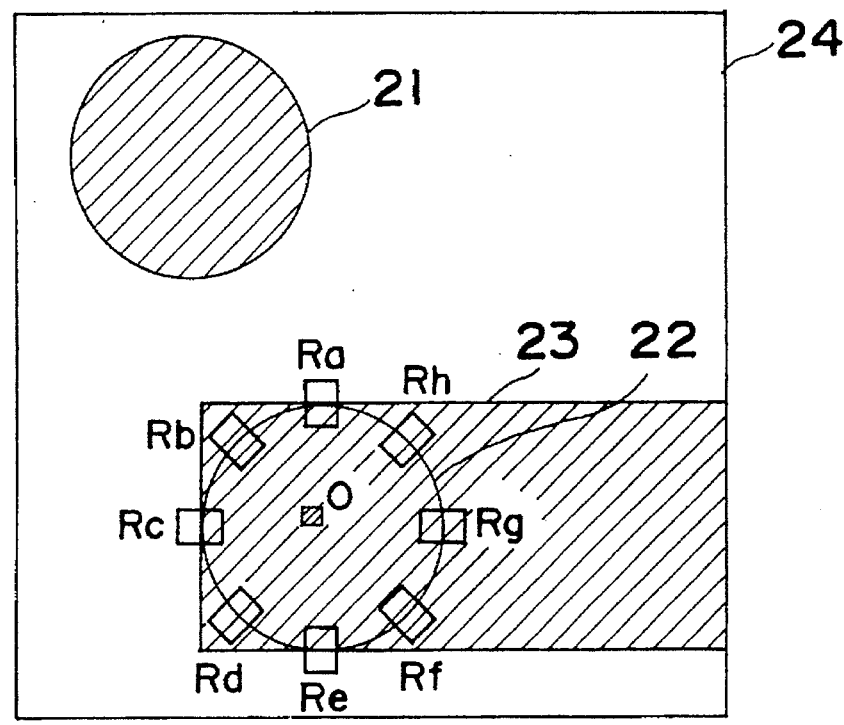
FIG. 17 is a view showing a case where the density reference area is on the rectangular hole side in the second embodiment.
Figure 18:
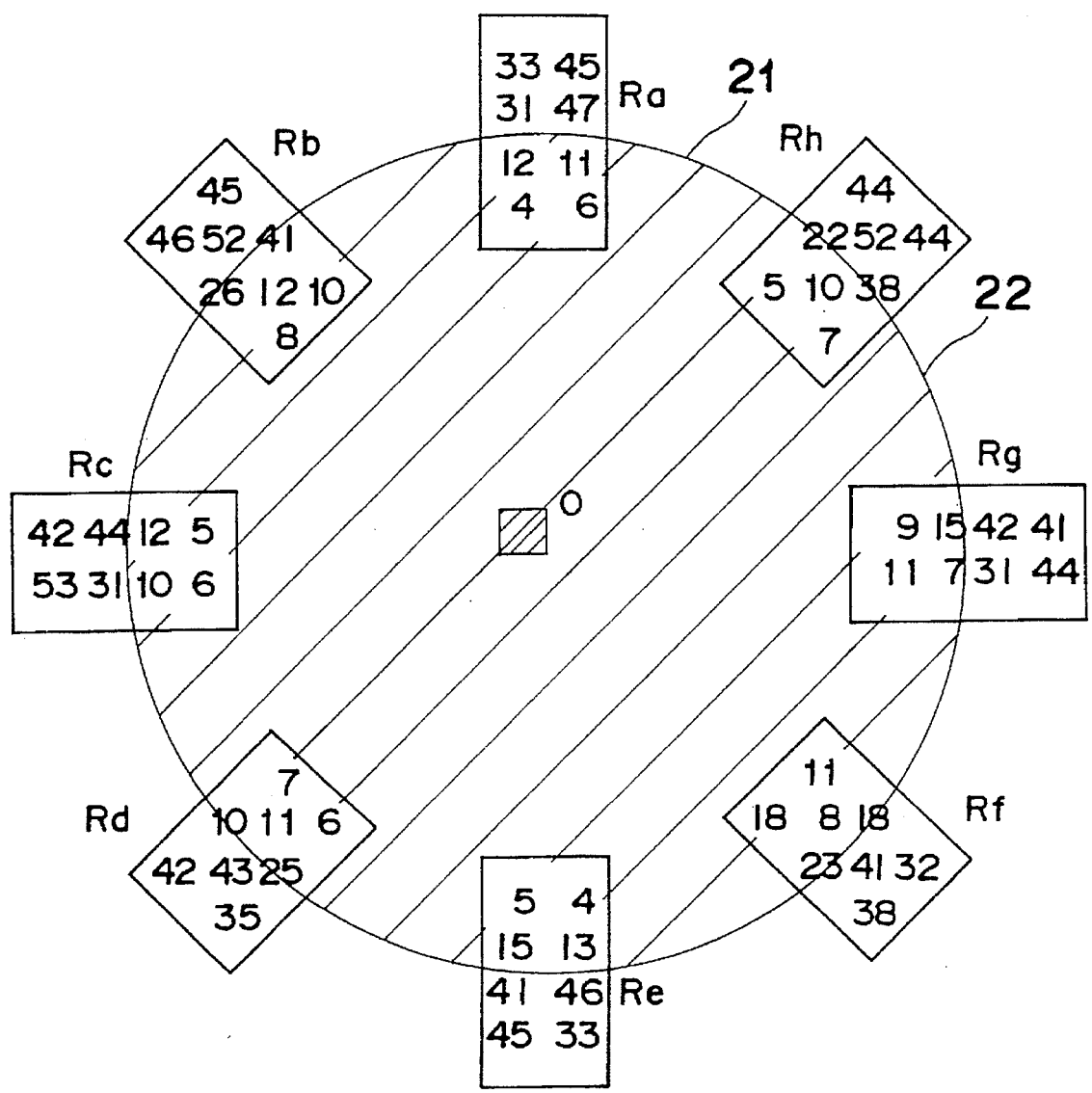
FIG. 18 is a view showing values of image density detected when the density reference area is on the circular hole side in the second embodiment.
Figure 19:
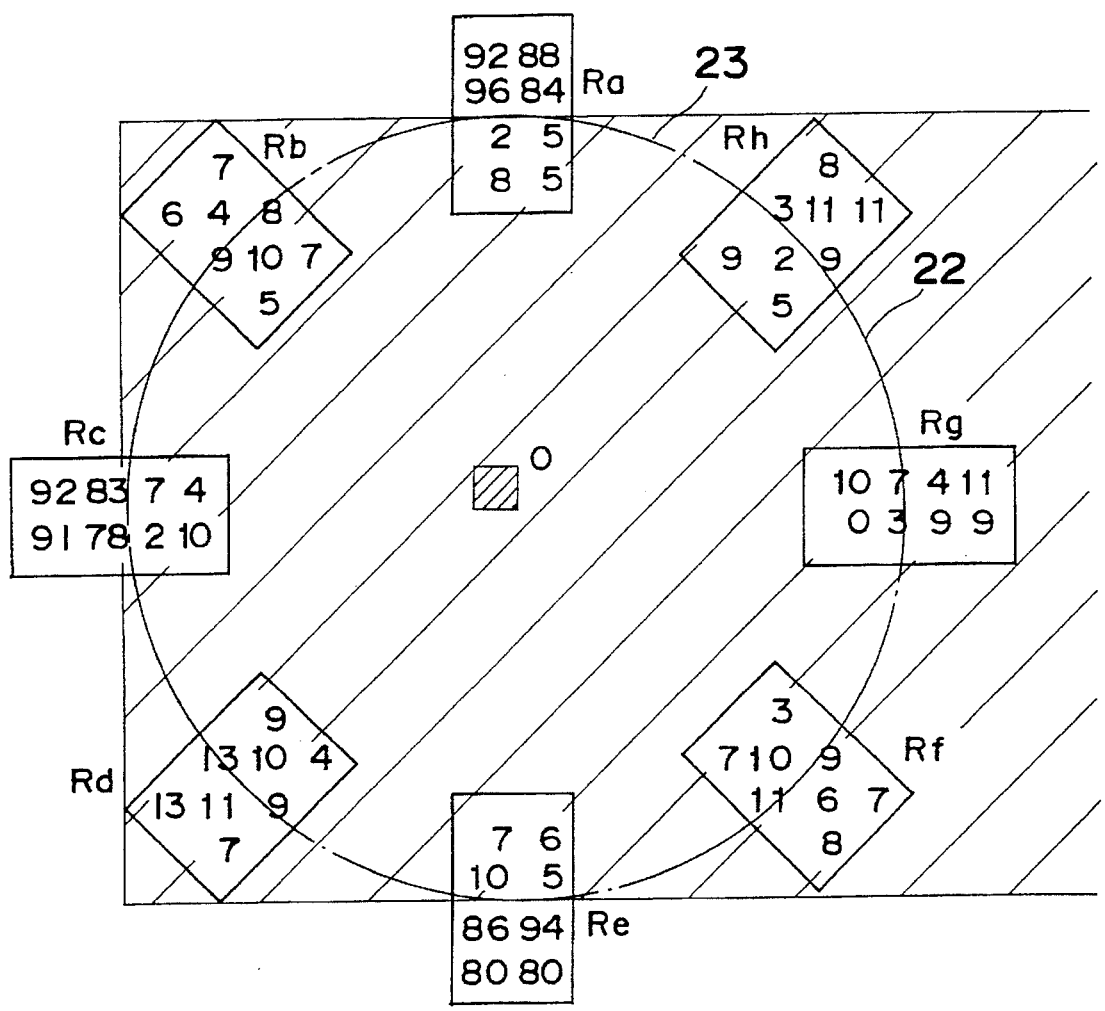
FIG. 19 is a view showing values of image density detected when the density reference area is on the rectangular hole side in the second embodiment.
Figure 20:
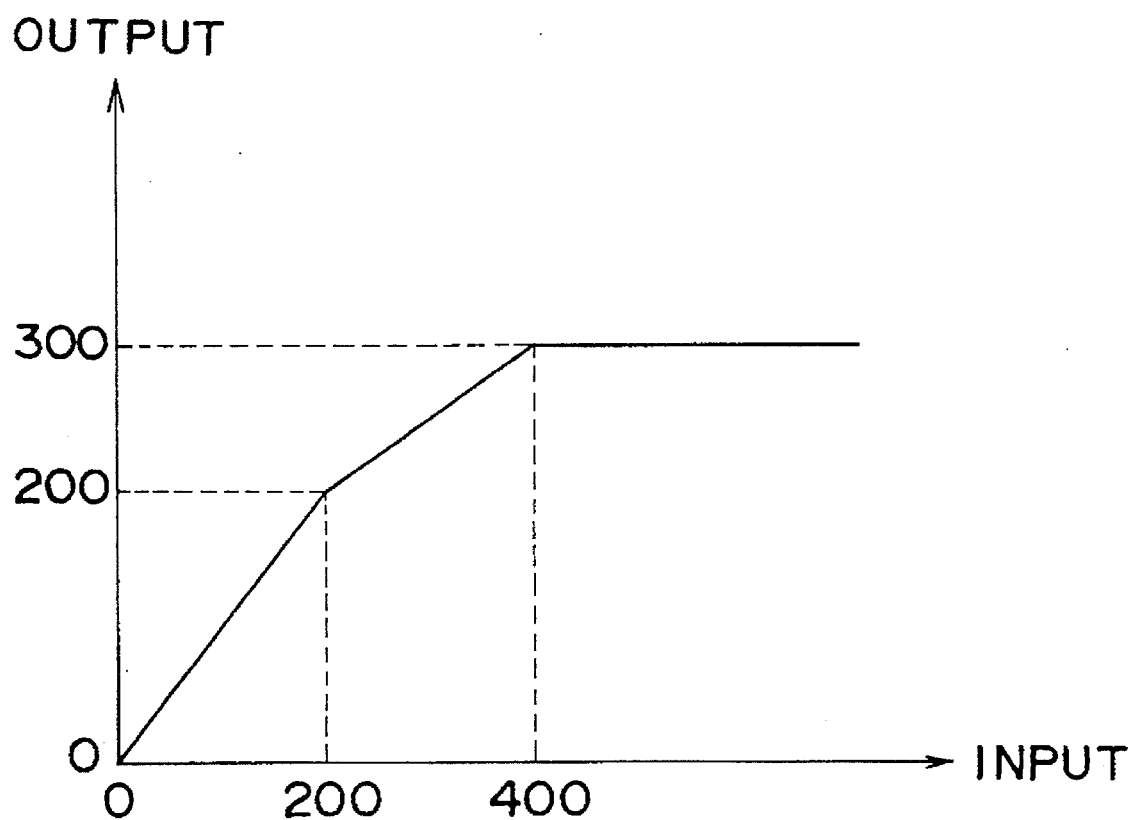
FIG. 20 is a view showing a conversion table of the second embodiment.

Further, FIG. 15 is a view showing the image of the object. FIG. 16 is a view showing a case where the density reference area is coincident with the circular hole. FIG. 17 is a view showing a case where the density reference area is beside a rectangular hole. FIG. 18 is a view showing the values of image density detected when the density reference area is coincident with the circular hole. FIG. 19 is a view showing the values of image density detected when the density reference area is beside the rectangular hole. FIG. 20 is a view showing the conversion table of the second embodiment.

First, as the teaching process of the first embodiment, the image which corresponds to an image will be picked-up by a camera 1 at step #31 described below is divided into a plurality of pixels (step #21).

Then, as shown in FIG. 12, a circle 22 having a shape identical to that of a circular hole 21, which is the shape to be detected, is assumed and sub-areas Ra to Rh each composed of eight pixels are set on and near the circumference of the circle 22. The sub-areas Ra to Rh are referred to collectively as a density reference area (step #22).

At this point, positions where the pixels constituting the density reference area are present are stored into the main memory 101 as a relative position with respect to a target pixel O.

Subsequently, coefficients of −1, 0, and 1 are set to the pixels constituting the density reference area (step #23). As the coefficient, −1 is assigned to pixels present inside the circumference of the circle 22 out of the pixels present inside the sub-areas Ra to Rh. Meanwhile, 1 is assigned to pixels present outside the circumference of the circle 22. Moreover, 0 is assigned to pixels present and extended over the circumference of the circle 22.

After the above steps #21–#23 are carried out as a preprocessing stage, an object 24 including a circular hole 21, which is the object of detection, and a rectangular hole 23 is prepared for the detecting process.

First, light is applied to the object 24 including the circular hole 21 with a diameter D, which is the object of detection, by the ring type illuminator 6 of FIG. 5 as in the first embodiment. By the light being applied, the surface of the object 24 is uniformly illuminated, so that the circular hole 21 becomes a dark shadow. It is to be noted that the rectangular hole 23 with one side of a length D is present inside the object 24 of the second embodiment, as shown in FIG. 15, also forming a dark shadow.

Next, the image of the object 24 is picked up by the camera 1 (step #31). At the step #32, image densities are converted into digital values by the analog-to-digital converter 7 so that discrete image density values can be obtained for the pixels divided at step #21. Thereafter, an image of the object 24 is stored into the image memory 8 (step #33).

Next, the target pixel 0, i.e., the density reference area is sequentially moved within the image of the object 24 (step #34). Then, for each position of movement of the target pixel O, a product (hereinafter, referred to as partial density correlation value) of the coefficients set to the pixels of the sub-areas Ra to Rh at step #23 and image densities of their corresponding pixels is calculated (step #35).

Assume that when the target pixel O is present at a position within the image of the object, image densities of the pixels present inside the sub-areas Ra to Rh are a1 to a8, b1 to b8, c1 to c8, d1 to d8, e1 to e8, f1 to f8, g1 to g8, and h1 to h8, as shown in FIG. 14. Then, the resulting partial density correlation values Va, Vb, Vc, Vd, Ve, Vf, Vg, and Vh for the sub-areas Ra to Rh, respectively, can be expressed by Expressions 3, 4, 5, 6, 7, 8, 9, and 10:

$$Va = a1 + a2 + a3 + a4 - a5 - a6 - a7 - a8 \quad \text{(Expression 3)}$$
$$Vb = b1 + b2 + b3 \quad\quad\quad\quad - b6 - b7 - b8 \quad \text{(Expression 4)}$$
$$Vc = c1 + c2 - c3 - c4 + c5 + c6 - c7 - c8 \quad \text{(Expression 5)}$$
$$Vd = -d1 \quad - d3 - d4 + d5 + d6 \quad\quad\quad + d8 \quad \text{(Expression 6)}$$
$$Ve = -e1 - e2 - e3 - e4 + e5 + e6 + e7 + e8 \quad \text{(Expression 7)}$$
$$Vf = -f1 - f2 - f3 \quad\quad\quad\quad + f6 + f7 + f8 \quad \text{(Expression 8)}$$
$$Vg = -g1 - g2 + g3 + g4 - g5 - g6 + g7 + g8 \quad \text{(Expression 9)}$$
$$Vh = h1 \quad + h3 + h4 - h5 - h6 \quad\quad\quad - h8 \quad \text{(Expression 10)}$$

First, by the first embodiment's method for shape detection, shape detection is attempted with respect to the image of the object of the second embodiment.

Here considered is a case where when the target pixel O has moved inside the image of the object until the circle 22, which is the reference for setting the density reference area, becomes coincident with the circular hole 21 as shown in FIG. 16, image densities as shown in FIG. 18 are obtained. In this case, partial density correlation values Va1, Vb1, Vc1, Vd1, Ve1, Vf1, Vg1, and Vh1 for the sub-areas Ra to Rh calculated by Expressions 3 to 10 are shown in Table 1.

TABLE 1

| Sub-area | Partial density correlation value | Sub-area | Partial density correlation value |
|---|---|---|---|
| Ra | Va1 = 123 | Re | Ve1 = 128 |
| Rb | Vb1 = 113 | Rf | Vf1 = 79 |
| Rc | Vc1 = 138 | Rg | Vg1 = 116 |
| Rd | Vd1 = 96 | Rh | Vh1 = 118 |

Hence, the density correlation value V1 obtained when the circle 22 is coincident with the circular hole 21 can be expressed by Expression 11:

$$V1 = Va1 + Vb1 + Vc1 + Vd1 + Ve1 + Vf1 + Vg1 + Vh1 \quad \text{(Expression 11)}$$
$$= 911$$

Similarly, below considered is a case where the circumference of the circle 22 is in contact with three sides of the rectangular hole 23 as shown in FIG. 17. In this case, partial density correlation values Va2, Vb2, Vc2, Vd2, Ve2, Vf2, Vg2, and Vh2 for the sub-areas Ra to Rh calculated by Expressions 3 to 10 are shown in Table 2.

TABLE 2

| Sub-area | Partial density correlation value | Sub-area | Partial density correlation value |
|---|---|---|---|
| Ra | Va2 = 340 | Re | Ve2 = 312 |
| Rb | Vb2 = −5 | Rf | Vf2 = 1 |
| Rc | Vc2 = 321 | Rg | Vg2 = 12 |
| Rd | Vd2 = 8 | Rh | Vh2 = 14 |

Hence, the density correlation value V2 obtained when the circumference of the circle 22 is in contact with three sides of the rectangular hole 23 can be expressed by Expression 12:

$$V2 = Va2 + Vb2 + Vc2 + Vd2 + Ve2 + Vf2 + Vg2 + Vh2 \quad \text{(Expression 12)}$$
$$= 1003$$

In the first embodiment's method for shape detection, a comparison between V1 and V2 is made as to which is greater or smaller, and as a result, the rectangular hole 23 is recognized as the detection object. It can therefore be understood that when some portion that involves large density variation is present besides the portion of the true detection object, there is a possibility of misdetection. The reason of the misdetection is that when the circumference of the circle 22 is in contact with three sides of the rectangular hole 23, the partial density correlation values Va2, Vc2, and Ve2 obtained for the sub-areas Ra, Rc, and Re, respectively, are very great.

Next, shape detection is attempted by the method for shape detection according to the second embodiment of the present invention with respect to the image of the object.

In the method for shape detection according to the second embodiment, partial density correlation values Va to Vh for the sub-areas Ra to Rh, respectively, are first calculated and then converted by a conversion table as shown in FIG. 20 consisting of functions as defined by later-described Expressions 13, 14, and 15 (step #36). Then, the density correlation value is calculated as a total sum of the partial density correlation values obtained after the conversion (step #37) and then is stored in the main memory 101 at step #38.

At a time point when the target pixel O has been moved throughout the inside of the image of the object (step #39), the position of the target pixel O, or the position of the circle 22, corresponding to the maximum density correlation value is found, whereby shape detection is performed (step #40). At step #41, the detected result is outputted from the CPU 100 to the external device 102.

Now the steps #36 to #40 are explained.

If a value X prior to conversion is converted into a value F(X) by the conversion table, then the functions constituting the conversion table can be expressed by the following Expressions 13, 14, and 15:

$$F(X) = X \quad (X \leq 200) \quad \text{(Expression 13)}$$

$$F(X) = 200 + 0.5(X - 200) \quad (200 < X \leq 400) \quad \text{(Expression 14)}$$

$$F(X) = 300 \quad (400 < X) \quad \text{(Expression 15)}$$

The partial density correlation values converted by the conversion table (step #36) are shown in Table 3 and Table 4. Table 3 is a table that shows values resulting from converting by the conversion table the partial density correlation values (Table 1) obtained when the circle 22 is coincident with the circular hole 21. Table 4 is a table that shows values resulting from converting by the conversion table the partial density correlation values (Table 2) obtained when the circumference of the circle 22 is coincident with three sides of the rectangular hole 23. Table 3:

TABLE 3

| Sub-area | Partial density correlation value | Sub-area | Partial density correlation value |
|---|---|---|---|
| Ra | F(Va1) = 123 | Re | F(Ve1) = 128 |
| Rb | F(Vb1) = 113 | Rf | F(Vf1) = 79 |
| Rc | F(Vc1) = 138 | Rg | F(Vg1) = 116 |
| Rd | F(Vd1) = 96 | Rh | F(Vh1) = 118 |

TABLE 4

| Sub-area | Partial density correlation value | Sub-area | Partial density correlation value |
|---|---|---|---|
| Ra | F(Va2) = 270 | Re | F(Ve2) = 256 |
| Rb | F(Vb2) = −5 | Rf | F(Vf2) = 1 |
| Rc | F(Vc2) = 260.5 | Rg | F(Vg2) = 12 |
| Rd | F(Vd2) = 8 | Rh | F(Vh2) = 14 |

Hence, the density correlation value VF1 obtained when the circle 22 is coincident with the circular hole 21, and the density correlation value VF2 obtained when the circumference of the circle 22 is in contact with three sides of the rectangular hole 23 can be expressed by Expression 16 and Expression 17, respectively (step #37):

$$\begin{aligned} VF1 &= F(Va1) + F(Vb1) + F(Vc1) + F(Vd1) + \\ & \quad F(Ve1) + F(Vf1) + F(Vg1) + F(Vh1) \\ &= 911 \end{aligned} \quad \text{(Expression 16)}$$

$$\begin{aligned} VF2 &= F(Va2) + F(Vb2) + F(Vc2) + F(Vd2) + \\ & \quad F(Ve2) + F(Vf2) + F(Vg2) + F(Vh2) \\ &= 816.5 \end{aligned} \quad \text{(Expression 17)}$$

Finally, at a time point when the target pixel O has been moved throughout the inside of the image of the object (step #39), a maximum of density correlation value is found (step #40). In the second embodiment, the result is VF1>VF2, where the circular hole 21 is detected as the detection object.

According to the embodiment, by the above method, when the partial density correlation values calculated with the density reference area being moved within the image of the object have shown a value greater than a specified value, the relative ratio of the value to the total sum of the partial density correlation values is reduced by the conversion table and thereafter the total sum is calculated to determine the density correlation value. As a result, there will no longer occur such a case that partial density correlation values come into prominence in a small number of sub-areas so as to make the density correlation value abnormally great. That is, according to the method for shape detection of the first and second embodiments, even when some portions having considerable variation in density due to incidence of light from outside, the state of the object, and the like are involved in the image other than the detection shape, the shape detection can be correctly performed without being substantially affected by the portions.

Hereinbelow, a third embodiment of the present invention is described with reference to the accompanying drawings.

Figure 22:
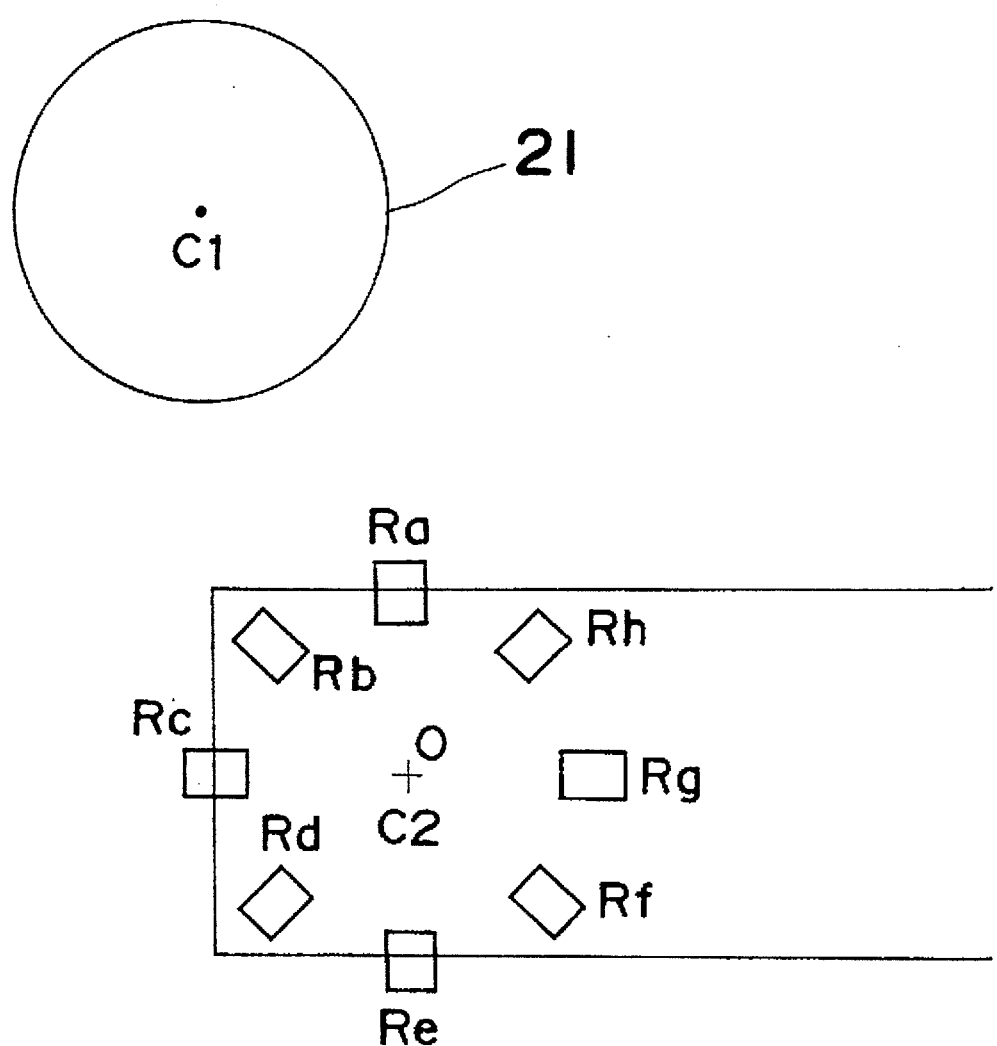
FIG. 22 is a view for explaining a case where the target pixel is coincident with a position other than the center of the circular hole in the third embodiment.

In the third embodiment of the invention, as in the second embodiment described above, the object to be detected is a circular hole 21 as shown in FIG. 15. It is assumed that when the center point C1 of the circular hole 21 within the image has been made coincident with the target pixel O as shown in FIG. 21, the partial density correlation values of Table 1 are obtained, and that when a pixel C2 located at a position different from the center point C1 of the circular hole 21 has been made coincident with the target pixel O as shown in FIG. 22, the partial density correlation values of Table 2 are obtained. The third embodiment is characterized in that the density correlation value is calculated by a method as shown in FIG. 23 with the use of these partial density correlation values.

Figure 23:
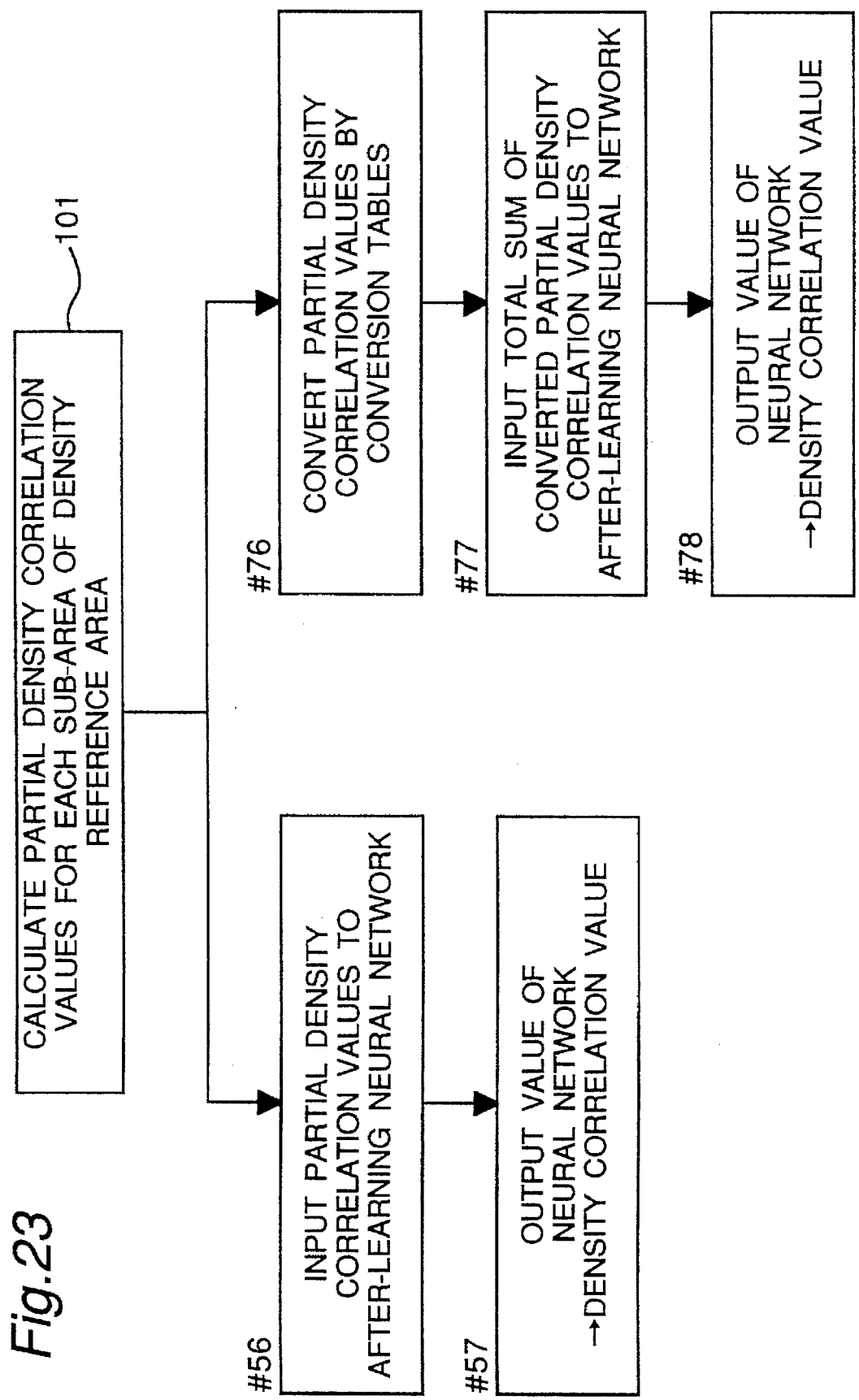
FIG. 23 is a flow chart for explaining the method of calculating the density correlation value in the third embodiment and a fourth embodiment of the present invention.
Figure 24:
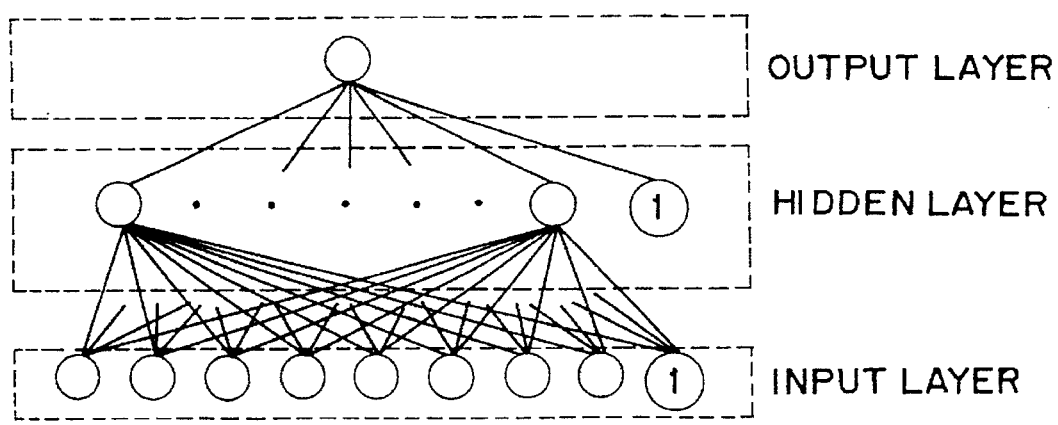
FIG. 24 is a view for explaining the neural network used to calculate the density correlation value in the third embodiment.
Figure 30:
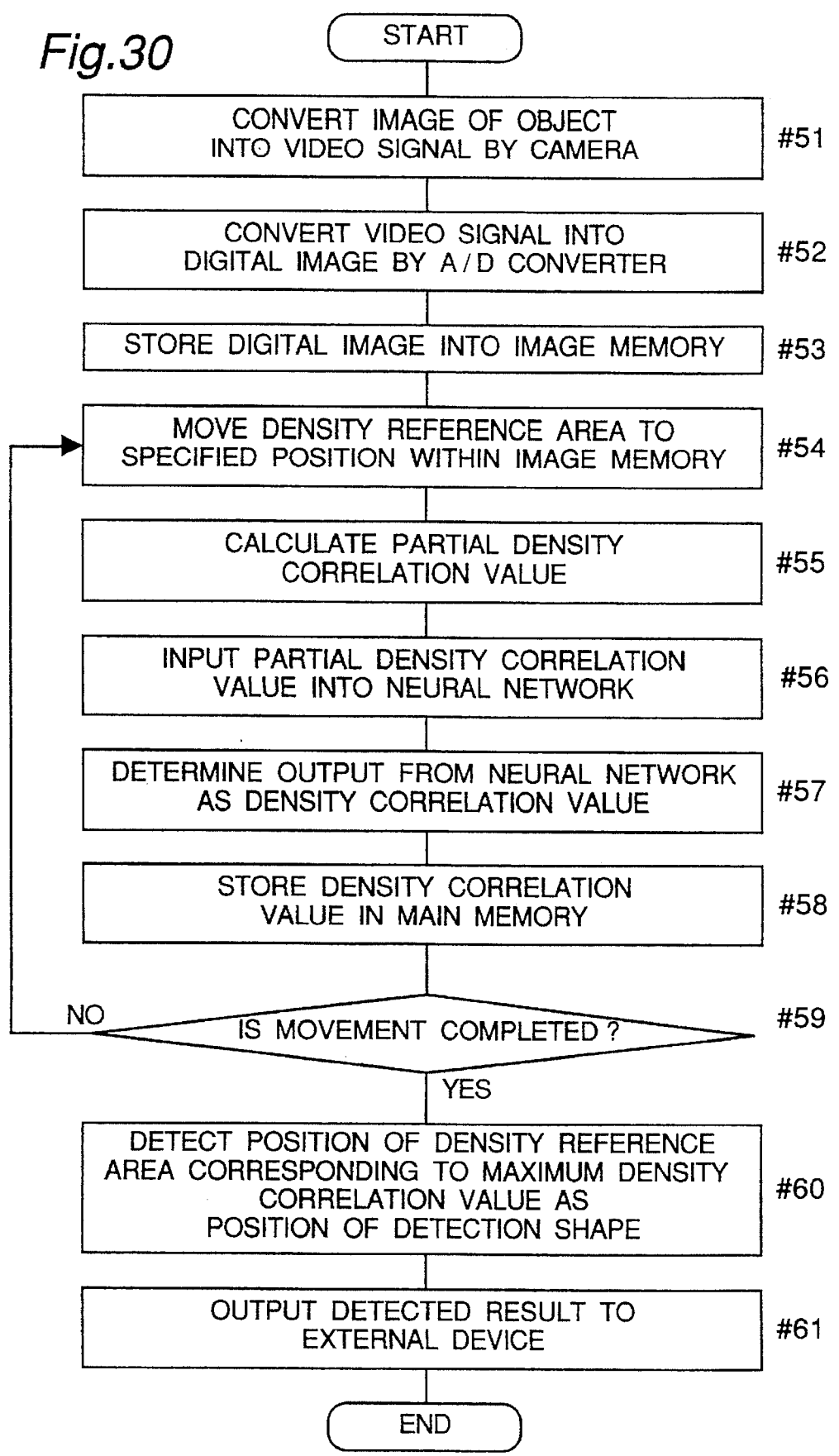
FIG. 30 is a flow chart for explaining the method of calculating the density correlation value in the third embodiment.

Referring to FIG. 23, in the third embodiment of the present invention, the processes at steps #51–55 in FIG. 30 correspond to those at steps #31–35 in the second embodiment, respectively. At step #56, eight partial density correlation values are calculated for each sub-area of the density reference area by Expressions 3–10, and the resulting values are inputted to an input layer of a three-layer hierarchical neural network as shown in FIG. 24 (step #56), where values outputted from an output layer as a result of the processing are taken as the density correlation value (step #57) and thus stored in the main memory 101 at step #58. The units are coupled between the input layer and a hidden layer, and between the hidden layer and the output layer. The input layer and the hidden layer each have one unit that has no input and whose output is always 1. The number of the hidden layer units is determined by trial-and-error so that processing time and recognition performance each can become a desirable value. At step #59, it is decided whether or not the movement of the density reference area is completed. If no, the program returns to step #54 to repeat the processes at steps #54–58. If yes, the program proceeds to step #60 and then #61 which respectively correspond to those at step #40 and #41 in the second embodiment. The calculation algorithm for such a neural network is exemplified by one as reported in "D. E. Rumelhart, G. E. Hinton & R. J. Williams:Learning representations by back-propagating errors; Nature, Vol. 323 9, pp. 533–536 (1986)." Since a sigmoid function as shown by T(X) in Expression 18 is used as the transfer function of the neural network, its output value is 1 at maximum and 0 at minimum.

$$T(X)=1/(1+\exp(-X)) \quad \text{(Expression 18)}$$

The neural network is assumed to previously learn that, for one or more learning-use image, the output value is 1 for the input of the partial density correlation values calculated for each area when the center point of the circular hole is made coincident with the target pixel O, and otherwise, the output value is 0. Such a way that the internal structure is determined by the presence of an image is another advantage of using the neural network.

Figure 25:
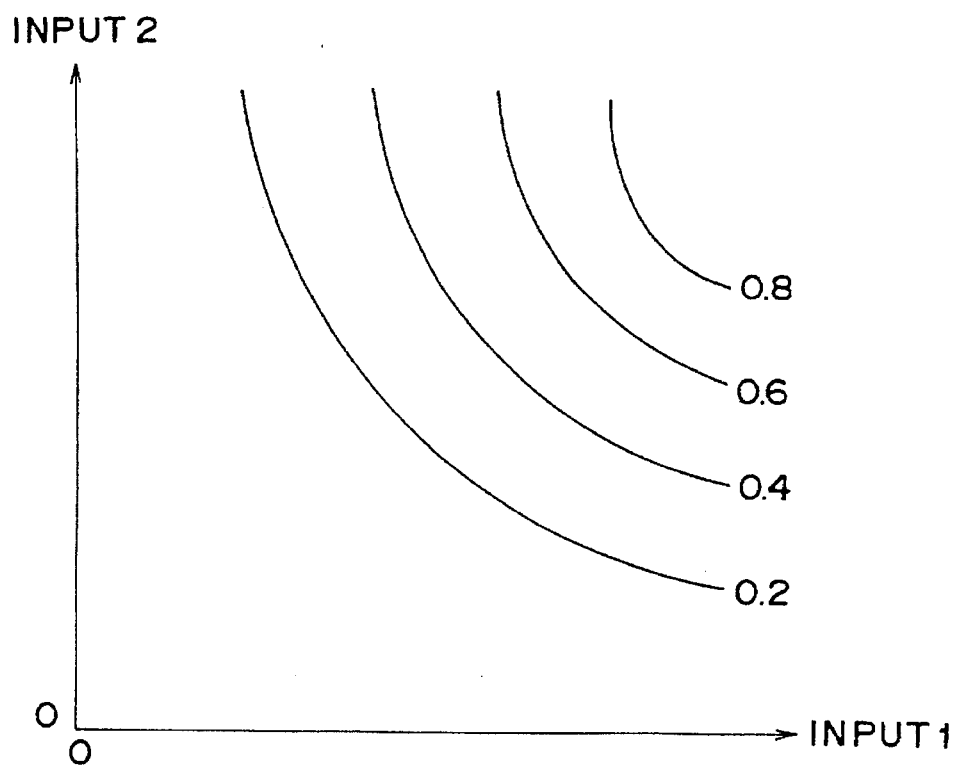
FIG. 25 is a view for explaining a state of separated two-dimensional space by the after-learning neural network in the third embodiment.

Whereas the number of dimensions of the input value of the neural network in the third embodiment is 8, a state of separation of two-dimensional space by the after-learning neural network (previously-learned neural network) with the number of dimensions of the input set to 2 is shown in FIG. 25. FIG. 25 shows by each one continuous line a set of points that are equal in output value when values in the individual axes shown by one point on the two-dimensional coordinates are used as inputs, their respective output values of the lines being shown in FIG. 25. The neural network has a structure in which the output value becomes large in the case where input values for individual dimensions are relatively large and do not deviate to a great extent. Moreover, the neural network is such that the input space is separated nonlinearly so as to be coincident with learning data. For example, to the neural network that has learned in this way, an output value of 0.8 is obtained when the partial density correlation values as shown in Table 1 are inputted, while another output value of 0.1 is obtained when the partial density correlation values as shown in Table 2 are inputted, with the same neural network. In this case, it is shown that the former output value is closer to 1 and therefore closer to the detection shape, that is, that C1 is closer to a circle, which is the detection shape, than C2. Thus, correct shape detection has been accomplished.

Figure 26:
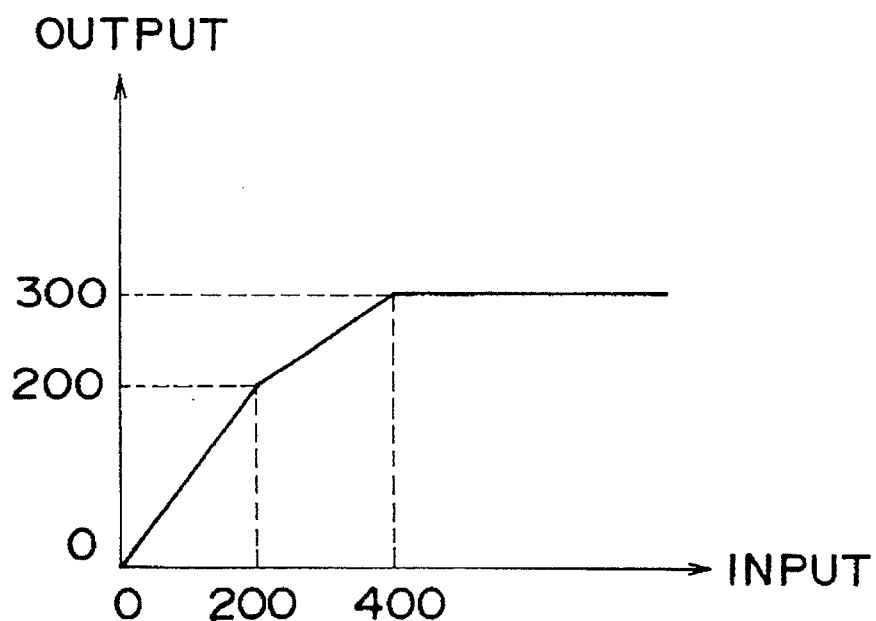
FIG. 26 is a view for explaining a first kind of conversion table used to calculate the density correlation value in a fourth embodiment of the present invention.
Figure 27:
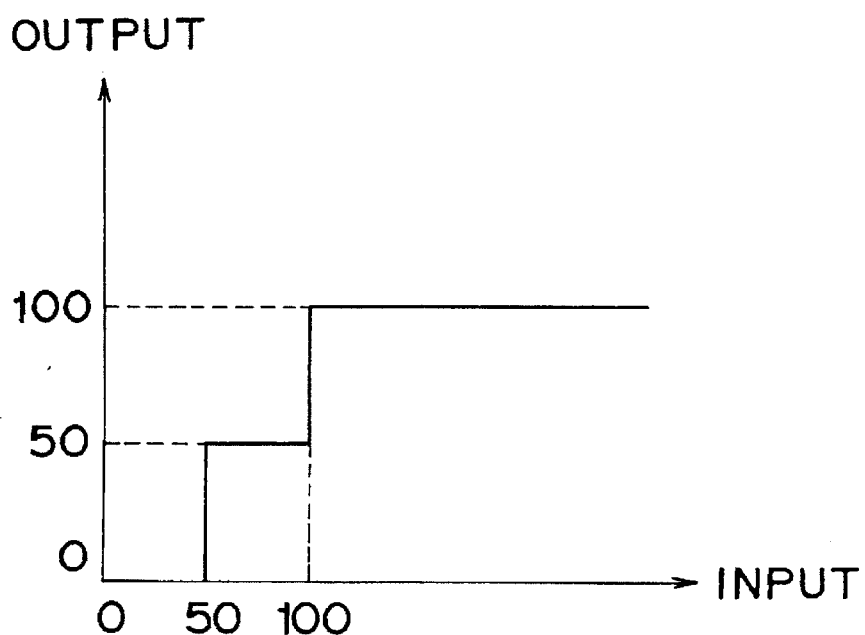
FIG. 27 is a view for explaining a second kind of conversion table used to calculate the density correlation value in the fourth embodiment.
Figure 28:
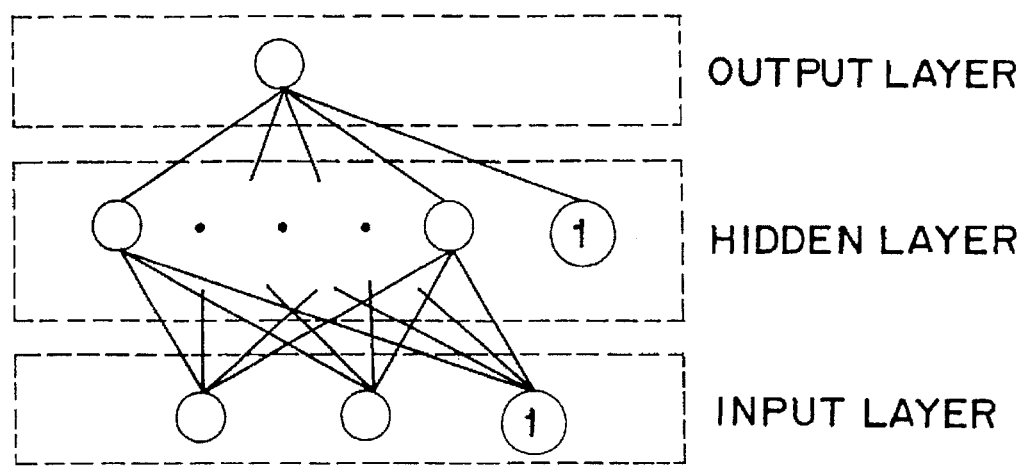
FIG. 28 is a view for explaining the neural network used to calculate the density correlation value in the fourth embodiment.
Figure 31:
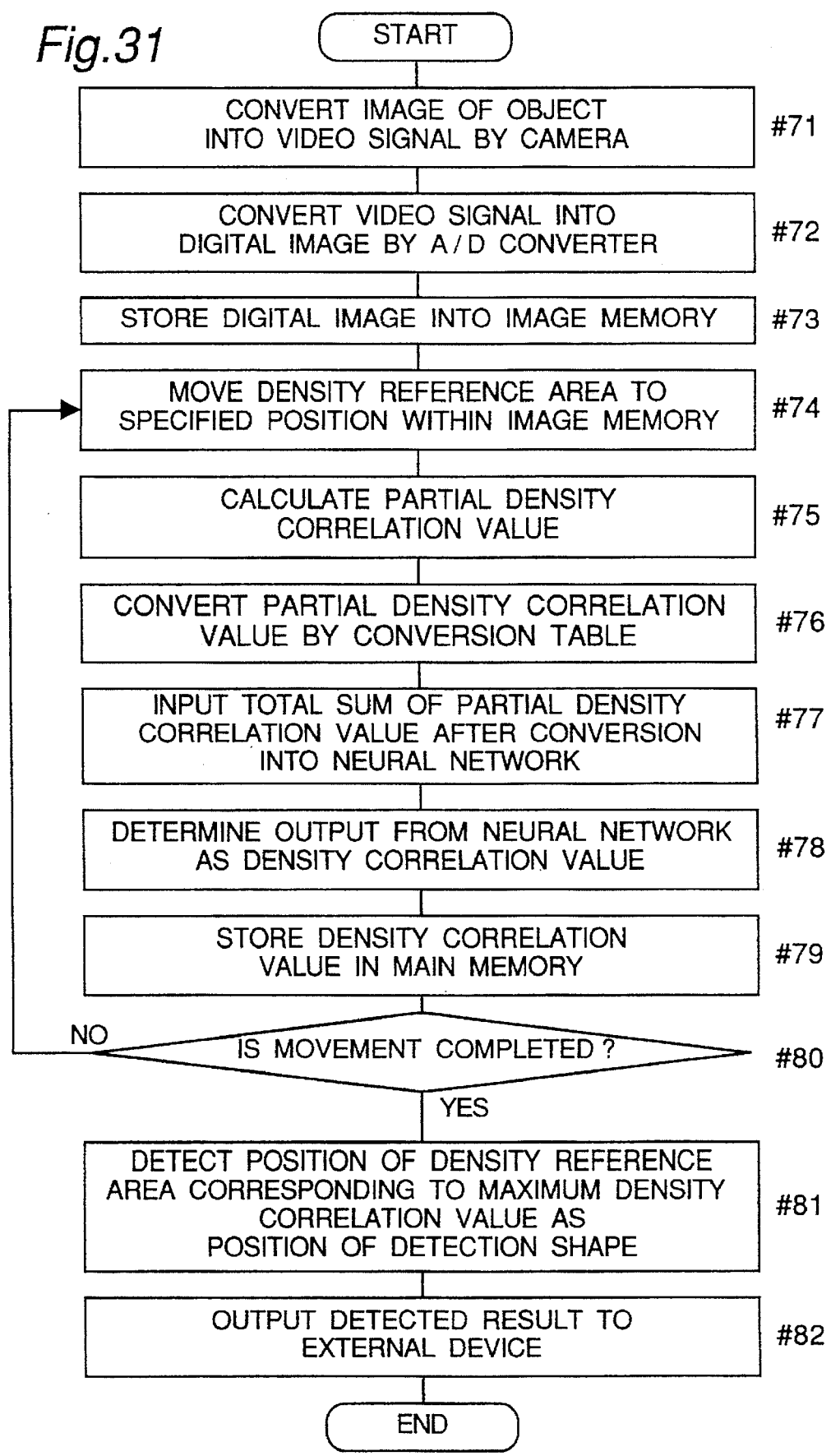
FIG. 31 is a flow chart for explaining the method of calculating the density correlation value in the fourth embodiment.
Figure 32:
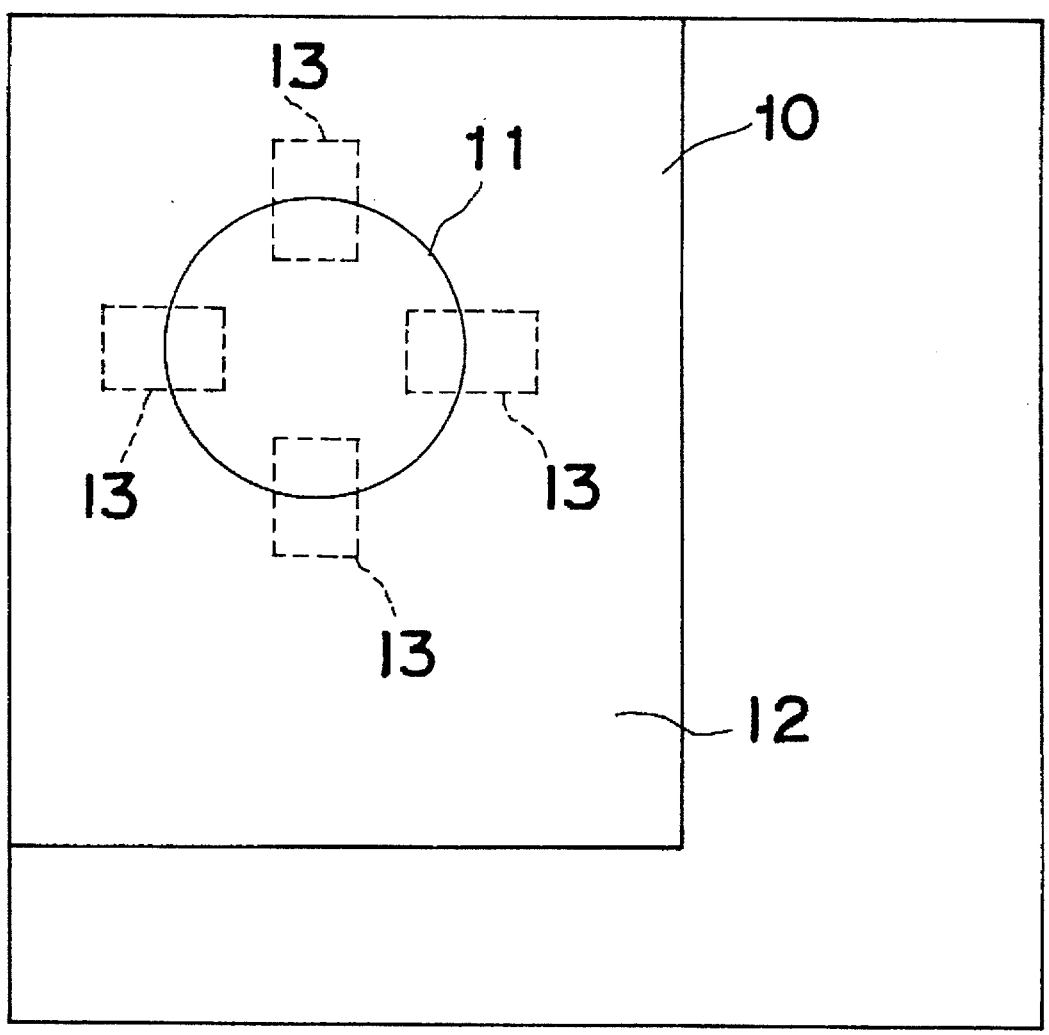
FIG. 32 is a view for explaining a conventional template matching method.

Referring to FIG. 23, in a fourth embodiment of the present invention, the processes at steps #71–75 in FIG. 31 correspond to those at steps #31–35 in the second embodiment, respectively. At step #76, eight partial density correlation values calculated by Expressions 3 to 10 are converted according to two kinds of conversion tables as shown in FIGS. 26 and 27, and the sums of the after-conversion values due to the respective tables are taken as inputs to the input layer of the neural network as shown in FIG. 28 (step #77), and the resulting output value of the output layer is taken as the density correlation value (step #78) and then stored in the main memory 101 at step #79. At step #80, it is decided whether or not the movement of the density reference area is completed. If no, the program returns to step #74 to repeat the processes at steps #74–79. If yes, the program proceeds to step #81 and then #82 which respectively correspond to those at step #40 and #41 in the second embodiment. The structure of the neural network is the same as in the third embodiment except that the number of input-layer units is changed from 8 to 2. It is noted that the number of input-layer units is a number excluding the unit that has no input and whose output is 1 at all times. The number of the hidden layer units is also determined by trial-and-error so that processing time and recognition performance each can become a desirable value, as in the third embodiment. The calculation algorithm of the neural network is also the same as in the third embodiment. If a value X prior to conversion is converted into F(X) by the conversion table as shown in FIG. 26 and converted into G(X) by the conversion table as shown in FIG. 27, then the relational expression between X and F(X), and between X and G(X) is as shown by Expressions 19 and 20, respectively:

$$F(X) = X \quad (X \leq 200) \quad \text{(Expression 19)}$$
$$F(X) = 200 + 0.5(X - 200) \quad (200 < X \leq 400)$$
$$F(X) = 300 \quad (400 < X)$$

$$G(X) = 0 \quad (X \leq 50) \quad \text{(Expression 20)}$$
$$G(X) = 50 \quad (50 < X \leq 100)$$
$$G(X) = 100 \quad (100 < X)$$

The partial density correlation values after the conversion by the conversion table of FIG. 26 is as shown in Table 5 when C1 is made coincident with the target pixel O, and as shown in Table 6 when C2 is made coincident with the target pixel O.

From the above steps, when C1 and C2 are made coincident with the target pixel O, the sums VF1 and VF2 of the partial density correlation values after the conversion by the conversion table of FIG. 26 are found by Expressions 21 and 22, respectively.

TABLE 5

| | |
|---|---|
| F(V1a) | 123 |
| F(V1b) | 113 |
| F(V1c) | 138 |
| F(V1d) | 96 |
| F(V1e) | 128 |
| F(V1f) | 79 |
| F(V1g) | 116 |
| F(V1h) | 118 |

TABLE 6

| | |
|---|---|
| F(V2a) | 270 |
| F(V2b) | −5 |
| F(V2c) | 260.5 |
| F(V2d) | 8 |
| F(V2e) | 256 |
| F(V2f) | 1 |
| F(V2g) | 12 |
| F(V2h) | 14 |

$$\begin{aligned} VF1 &= F(V1a) + F(V1b) + F(V1c) + F(V1d) + \\ & \quad F(V1e) + F(V1f) + F(V1g) + F(V1h) \\ &= 911 \end{aligned} \quad \text{(Expression 21)}$$

$$\begin{aligned} VF2 &= F(V2a) + F(V2b) + F(V2c) + F(V2d) + \\ & \quad F(V2e) + F(V2f) + F(V2g) + F(V2h) \\ &= 816.5 \end{aligned} \quad \text{(Expression 22)}$$

On the other hand, the partial density correlation values after the conversion by the conversion table of FIG. 27 is as shown in Table 7 when C1 is made coincident with the target pixel O, and as shown in Table 8 when C2 is coincident with the target pixel O.

From the above steps, when C1 and C2 are made coincident with the target pixel O, the sums VG1 and VG2 of the partial density correlation values after the conversion by the conversion table of FIG. 27 are determined by Expressions 23 and 24, respectively:

$$VG1 = G(V1a) + G(V1b) + G(V1c) + G(V1d) + \\ G(V1e) + G(V1f) + G(V1g) + G(V1h) \\ = 700 \quad \text{(Expression 23)}$$

$$VG2 = G(V2a) + G(V2b) + G(V2c) + G(V2d) + \\ G(V2e) + G(V2f) + G(V2g) + G(V2h) \\ = 300 \quad \text{(Expression 24)}$$

TABLE 7

| | |
|---|---|
| G(V1a) | 100 |
| G(V1b) | 100 |
| G(V1c) | 100 |
| G(V1d) | 50 |
| G(V1e) | 100 |
| G(V1f) | 50 |
| G(V1g) | 100 |
| G(V1h) | 100 |

TABLE 8

| | |
|---|---|
| G(V2a) | 100 |
| G(V2b) | 0 |
| G(V2c) | 100 |
| G(V2d) | 0 |
| G(V2e) | 100 |
| G(V2f) | 0 |
| G(V2g) | 0 |
| G(V2h) | 0 |

Figure 29:
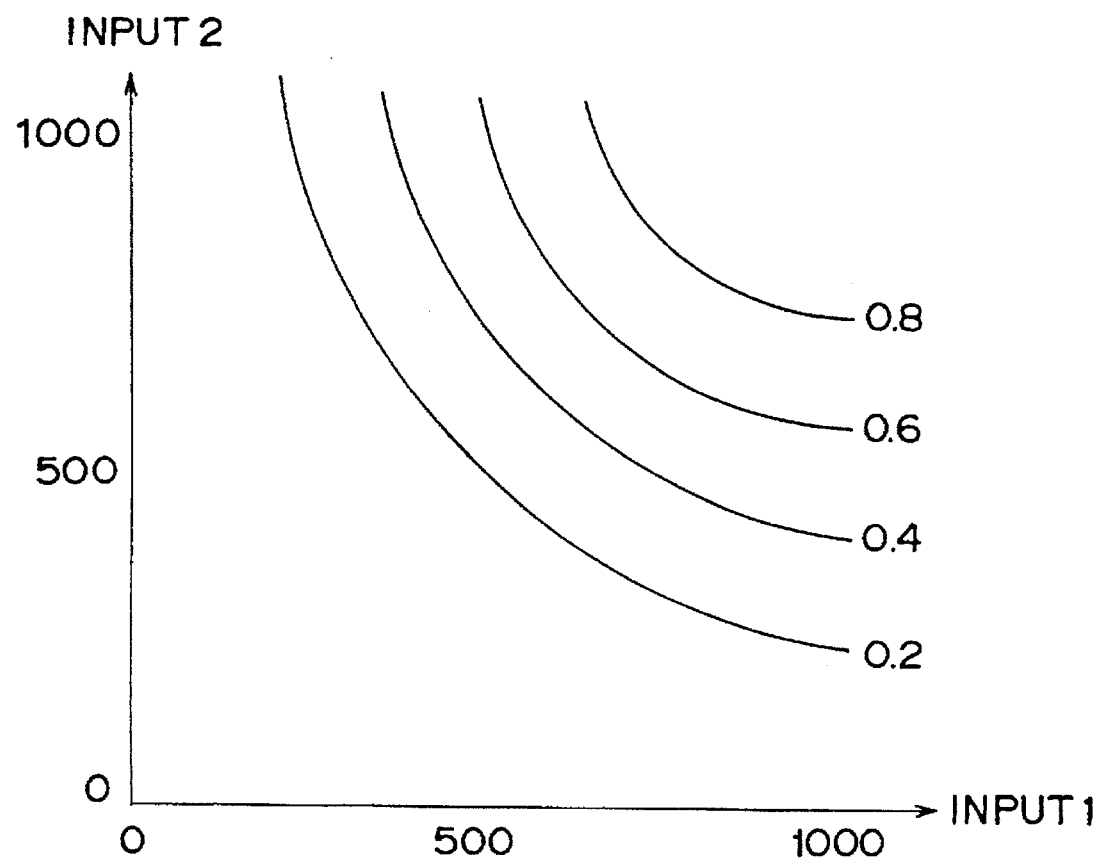
FIG. 29 is a view showing a state of separated two-dimensional space by the after-learning neural network in the fourth embodiment.

The neural network is assumed to previously learn that, for learning-use image previously prepared, the output value is 1 for the input of each of density correlation values resulting when the center point of the circular hole is made coincident with the target pixel O, and otherwise, the output value is 0. A state in which the two-dimensional space is separated by the after-learning neural network is shown in FIG. 29. FIG. 29, where the horizontal axis and the vertical axis represent sums of density correlation values after the conversion by the conversion tables of FIGS. 26 and 27, respectively, shows sets of such points that are equal in output value to one another when the input is values of the axes shown by one point on the two-dimensional coordinates, their respective output values being shown in FIG. 29. From FIG. 29, it can be understood that the neural network has such a structure that the output value is large for such inputs that the input values in both horizontal and vertical axes are large to higher than a certain level, and that the input space is separated nonlinearly so as to be coincident with leaning data. With this neural network, if VF1 and VG1 obtained by Expressions 21 and 23 are assumed to be "input 1" and "input 2", respectively, then an output value of 0.75 is obtained. On the other hand, with the same neural network, if VF2 and VG2 obtained by Expressions 22 and 24 are assumed to be "input 1" and "input 2", respectively, then an output value of 0.22 is obtained. In this case, it is shown that the former output value is closer to 1 and therefore closer to the detection shape, that is, C1 is closer to a circle, which is the detection shape, than C2. Thus, correct detection has been accomplished.

In the above embodiments, the position of the specified shape has been detected with the position of such a target pixel that the density correlation value shows a maximum when the target pixel O has been moved within the image. However, the position of the specified shape can also be detected with the position of such a target pixel that the density correlation value shows a minimum.

According to the present invention, even if some portions having considerable density variation are present in the image except that the detection shape, shape detection can be accomplished without being substantially affected by such portions.

Although the second embodiment is required to determine the shape of the conversion table by an operator's experience and/or trial-and-error, thus taking much time and labor. In the third embodiment, the partial density correlation values are inputted to the neural network and the output obtained from the neural network is used as the density correlation value. The neural network has been previously learned so as to obtain a specified output with respect to the image of the object. That is, without depending on the operator's experience and/or trial-and-error, the detection of the shape position of the object is taught to perform the specified detection.

In order to solve the disadvantage for requiring the operation for determining the shape of the conversion table based on the operator's experience and/or trail-and-error, in the fourth embodiment, the density correlation values obtained by the similar processes to the second embodiment are calculated by using one or more conversion tables, the density correlation value obtained for each conversion table is inputted to the neural network, and then the output value obtained from the neural network is used as the density correlation value. By this method, without depending on the operator's experience and trail-and-error like the third embodiment, the detection of the shape detection of the object is taught to perform the specified detection.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method for detecting a relative position of a portion of an object, the portion having a predetermined shape within the object, said method being carried out with reference to a teaching process which includes dividing a reference image of the object into a plurality of pixels in a matrix state and designating a reference target pixel among the plurality of pixels within the reference image, setting a plurality of sub-areas each composed of a plurality of pixels and each extending across a peripheral boundary of the predetermined shape within the reference image, the plurality of sub-areas collectively defining a density reference area, storing respective positions of the plurality of pixels within the density reference area relative to a position of the target pixel, and assigning each of the plurality of pixels contained in the density reference area a coefficient value from among plural predetermined coefficient values in accordance with a location of each respective pixel relative to the predetermined shape within the reference image, said method comprising:

a first step of using a camera to obtain an image of the object and detecting an image density of each of plural pixels of the image of the object;

a second step of designating a target pixel among the plural pixels of the object, calculating products of the coefficient values assigned in the teaching process and the respective image densities detected in said first step for each of the plural pixels contained within the density reference area by setting the target reference pixel coincident with the target pixel, and calculating a density correlation value from the products of the respective plural pixels; and a third step of successively changing a position of the target pixel within the image of the object so as to scan the image of the object, repeatedly performing said second step after each position change of the target pixel within the image of the object, determining a position of the target pixel at which the density correlation value is a predetermined one of a maximum and a minimum, and detecting the relative position at which the predetermined shape in the object is present as being coincident with the position of the target pixel at which the density correlation value is the predetermined one of the maximum and the minimum;

wherein said second step includes calculating a sum of the products for each of the sub-areas constituting the density reference area to obtain respective sums of products, and wherein said method further comprises:

a step of converting each of the respective sums of products into a partial density correlation value using a conversion table composed of an arbitrary function; and a step of calculating a total sum of the values as the density correlation value;

wherein the conversion table is composed of functions defined by a combination of a plurality of linear functions.

2. A method for detecting a relative position of a portion of an object, the portion having a predetermined shape within the object, said method being carried out with reference to a teaching process which includes dividing a reference image of the object into a plurality of pixels in a matrix state and designating a reference target pixel among the plurality of pixels within the reference image, setting a plurality of sub-areas each composed of a plurality of pixels and each extending across a peripheral boundary of the predetermined shape within the reference image, the plurality of sub-areas collectively defining a density reference area, storing respective positions of the plurality of pixels within the density reference area relative to a position of the target pixel, and assigning each of the plurality of pixels contained in the density reference area a coefficient value from among plural predetermined coefficient values in accordance with a location of each respective pixel relative to the predetermined shape within the reference image, said method comprising:

a first step of using a camera to obtain an image of the object and detecting an image density of each of plural pixels of the image of the object;

a second step of designating a target pixel among the plural pixels of the object, calculating products of the coefficient values assigned in the teaching process and the respective image densities detected in said first step for each of the plural pixels contained within the density reference area by setting the target reference pixel coincident with the target pixel, and calculating a density correlation value from the products of the respective plural pixels; and a third step of successively changing a position of the target pixel within the image of the object so as to scan the image of the object, repeatedly performing said second step after each position change of the target pixel within the image of the object, determining a position of the target pixel at which the density correlation value is a predetermined one of a maximum and a minimum, and detecting the relative position at which the predetermined shape in the object is present as being coincident with the position of the target pixel at which the density correlation value is the predetermined one of the maximum and the minimum;

wherein each of the plurality of pixels contained in the density reference area is assigned a first coefficient value when located within the peripheral boundary of the predetermined shape, a second coefficient value when located external the peripheral boundary of the predetermined shape, and a third coefficient value when located on the peripheral boundary of the predetermined shape, said first, second and third coefficient values all being different from one another.

3. A method for detecting a relative position of a portion of an object, the portion having a predetermined shape within the object, said method comprising a teaching process and a detection process;

said teaching process comprising, a first step of dividing a reference image of the object into a plurality of pixels in a matrix state and designating a reference target pixel among the plurality of pixels within the reference image, setting a plurality of sub-areas each composed of a plurality of pixels and each extending across a peripheral boundary of the predetermined shape within the reference image, the plurality of sub-areas collectively defining a density reference area, storing respective positions of the plurality of pixels within the density reference area relative to a position of the target pixel, and a second step of assigning each of the plurality of pixels contained in the density reference area a coefficient value from among plural predetermined coefficient values in accordance with a location of each respective pixel relative to the predetermined shape within the reference image;

said detection process comprising, a third step of using a camera to obtain an image of the object and detecting an image density of each of plural pixels of the image of the object;

a fourth step of designating a target pixel among the plural pixels of the object, calculating products of the coefficient values assigned in the teaching process and the respective image densities detected in said third step for each of the plural pixels contained within the density reference area by setting the target reference pixel coincident with the target pixel, and calculating a density correlation value from the products of the respective plural pixels, and a fifth step of successively changing a position of the target pixel within the image of the object so as to scan the image of the object, repeatedly performing said fourth step after each position change of the target pixel within the image of the object, determining a position of the target pixel at which the density correlation value is a predetermined one of a maximum and a minimum, and detecting the relative position at which the predetermined shape in the object is present as being coincident with the position of the target pixel at which the density correlation value is the predetermined one of the maximum and the minimum; and wherein said fourth step includes calculating a sum of the products for each of the sub-areas constituting the density reference area to obtain respective sums of products, and wherein said detection process further comprises:

a step of converting each of the respective sums of products into a partial density correlation value using a conversion table composed of an arbitrary function; and a step of calculating a total sum of the values as the density correlation value;

wherein the conversion table is composed of functions defined by a combination of a plurality of linear functions.

4. A method for detecting a relative position of a portion of an object, the portion having a predetermined shape within the object, said method comprising a teaching process and a detection process;

said teaching process comprising, a first step of dividing a reference image of the object into a plurality of pixels in a matrix state and designating a reference target pixel among the plurality of pixels within the reference image, setting a plurality of sub-areas each composed of a plurality of pixels and each extending across a peripheral boundary of the predetermined shape within the reference image, the plurality of sub-areas collectively defining a density reference area, storing respective positions of the plurality of pixels within the density reference area relative to a position of the target pixel, and a second step of assigning each of the plurality of pixels contained in the density reference area a coefficient value from among plural predetermined coefficient values in accordance with a location of each respective pixel relative to the predetermined shape within the reference image;

said detection process comprising, a third step of using a camera to obtain an image of the object and detecting an image density of each of plural pixels of the image of the object;

a fourth step of designating a target pixel among the plural pixels of the object, calculating products of the coefficient values assigned in the teaching process and the respective image densities detected in said third step for each of the plural pixels contained within the density reference area by setting the target reference pixel coincident with the target pixel, and calculating a density correlation value from the products of the respective plural pixels, and a fifth step of successively changing a position of the target pixel within the image of the object so as to scan the image of the object, repeatedly performing said fourth step after each position change of the target pixel within the image of the object, determining a position of the target pixel at which the density correlation value is a predetermined one of a maximum and a minimum, and detecting the relative position at which the predetermined shape in the object is present as being coincident with the position of the target pixel at which the density correlation value is the predetermined one of the maximum and the minimum;

wherein each of the plurality of pixels contained in the density reference area is assigned a first coefficient value when located within the peripheral boundary of the predetermined shape, a second coefficient value when located external the peripheral boundary of the predetermined shape, and a third coefficient value when located on the peripheral boundary of the predetermined shape, said first, second and third coefficient values all being different from one another.

* * * * *